(12) United States Patent
Bayramian et al.

(10) Patent No.: US 12,337,383 B2
(45) Date of Patent: Jun. 24, 2025

(54) PRINT CARTRIDGE FOR ADDITIVE MANUFACTURING

(71) Applicant: Seurat Technologies, Inc., Mountain View, CA (US)

(72) Inventors: Andrew J. Bayramian, Marblehead, MA (US); April L. Cooke, Billerica, MA (US); Cote LeBlanc, Malden, MA (US); Drew W. Kissinger, Carlisle, MA (US); Francis L. Leard, Sudbury, MA (US); Harold W. Chittick, North Andover, MA (US); James A. DeMuth, Woburn, MA (US); Jeffrey Jarboe, Wakefield, MA (US); Joseph Gillespie, Boxford, MA (US); Kourosh Kamshad, Hudson, NH (US); Nicholas C. Ferreri, Portsmouth, NH (US); Ning Duanmu, Nashua, NH (US); Susanne Kras, Chelmsford, MA (US); Summer Kapuaimilia Mundon, Medford, MA (US); Yiyu Shen, Tewksbury, MA (US); J. Thare MacDonald, Middleton, MA (US)

(73) Assignee: Seurat Technologies, Inc., Wilmington, MA (US)

( * ) Notice: Subject to any disclaimer, the term of this patent is extended or adjusted under 35 U.S.C. 154(b) by 161 days.

(21) Appl. No.: 17/330,961

(22) Filed: May 26, 2021

(65) Prior Publication Data

US 2021/0370406 A1 Dec. 2, 2021

Related U.S. Application Data

(60) Provisional application No. 63/030,757, filed on May 27, 2020.

(51) Int. Cl.
*B22F 12/00* (2021.01)
*B22F 10/28* (2021.01)
(Continued)

(52) U.S. Cl.
CPC .............. *B22F 10/28* (2021.01); *B22F 12/30* (2021.01); *B22F 12/38* (2021.01); *B22F 12/41* (2021.01);
(Continued)

(58) Field of Classification Search
CPC .......... B22F 10/28; B22F 12/67; B22F 12/41; B22F 12/38; B22F 12/90; B22F 12/52; B33Y 10/00; B33Y 30/00; B33Y 40/00
(Continued)

(56) References Cited

U.S. PATENT DOCUMENTS 7,357,629 B2 * 4/2008 Weiskopf ............... B33Y 30/00
425/188
7,537,722 B2 5/2009 Andersson et al.
(Continued)

FOREIGN PATENT DOCUMENTS

CN 105745060 A 7/2016
CN 108290180 7/2018
(Continued)

*Primary Examiner* — Jessee R Roe
*Assistant Examiner* — Michael Aboagye
(74) *Attorney, Agent, or Firm* — David R. Stevens; Stevens Law Group

(57) ABSTRACT

A cartridge for a manufacturing system includes a sealable chamber having a bed and a laser transparent window. A powder hopper can be positioned within the sealable chamber. A powder spreader is positioned within the sealable chamber for distributing powder from the powder hopper onto the bed.

16 Claims, 19 Drawing Sheets

(51) Int. Cl.

| | |
|---|---|
| *B22F 12/30* | (2021.01) |
| *B22F 12/41* | (2021.01) |
| *B22F 12/52* | (2021.01) |
| *B22F 12/67* | (2021.01) |
| *B22F 12/90* | (2021.01) |
| *B33Y 10/00* | (2015.01) |
| *B33Y 30/00* | (2015.01) |
| *B33Y 40/00* | (2020.01) |

(52) U.S. Cl.
CPC .............. *B22F 12/52* (2021.01); *B22F 12/67* (2021.01); *B22F 12/90* (2021.01); *B33Y 10/00* (2014.12); *B33Y 30/00* (2014.12); *B33Y 40/00* (2014.12)

(58) Field of Classification Search
USPC .................. 264/497; 266/135; 419/66, 38, 6
See application file for complete search history.

(56) References Cited

U.S. PATENT DOCUMENTS

| | | | | |
|---|---|---|---|---|
| 7,807,947 | B2 * | 10/2010 | Partanen | B29C 64/153 |
| | | | | 219/121.65 |
| 8,798,780 | B2 * | 8/2014 | Menchik | B41J 2/1752 |
| | | | | 347/86 |
| 10,107,834 | B2 * | 10/2018 | Humphris | G01Q 40/00 |
| 10,369,662 | B2 | 8/2019 | Ljungblad | |
| 11,141,919 | B2 * | 10/2021 | Lin | B29C 64/393 |
| 2014/0265047 | A1 * | 9/2014 | Burris | B23K 26/034 |
| | | | | 264/497 |
| 2014/0265049 | A1 | 9/2014 | Burris et al. | |
| 2017/0274590 | A1 | 9/2017 | Okazaki | |
| 2017/0341143 | A1 | 11/2017 | Abe et al. | |
| 2018/0133799 | A1 | 5/2018 | Stammberger et al. | |
| 2018/0264552 | A1 | 9/2018 | Herzog | |
| 2019/0143597 | A1 | 5/2019 | Huang et al. | |
| 2020/0147879 | A1 | 5/2020 | Hofmann et al. | |
| 2021/0370402 | A1 * | 12/2021 | Bayramian | B22F 12/30 |

FOREIGN PATENT DOCUMENTS

| | | |
|---|---|---|
| CN | 110116209 A | 8/2019 |
| DE | 102015222104 A1 | 5/2017 |
| DE | 102017118831 A1 | 2/2019 |
| EP | 1839781 A2 | 10/2007 |
| EP | 2537665 A1 | 12/2012 |
| EP | 3124140 A2 | 7/2016 |
| WO | 2016116139 A1 | 7/2016 |
| WO | 2019159642 A1 | 8/2019 |

* cited by examiner

PRINT CARTRIDGE FOR ADDITIVE MANUFACTURING

RELATED APPLICATION

The present disclosure is part of a non-provisional patent application claiming the priority benefit of U.S. Patent Application No. 63/030,757, filed on May 27, 2020, which is incorporated by reference in its entirety.

TECHNICAL FIELD

The present disclosure generally relates to a system and method for high throughput additive manufacturing. In one embodiment powder bed fusion manufacturing is supported by use of discrete print cartridges.

BACKGROUND

Traditional component machining often relies on removal of material by drilling, cutting, or grinding to form a part. In contrast, additive manufacturing, also referred to as 3D printing, typically involves sequential layer by layer addition of material to build a part. Beginning with a 3D computer model, an additive manufacturing system can be used to create complex parts from a wide variety of materials.

One additive manufacturing technique known as powder bed fusion (PBF) uses one or more focused energy sources, such as a laser or electron beam, to draw a pattern in a thin layer of powder by melting the powder and bonding it to the layer below to gradually form a 3D printed part. Powders can be plastic, metal, glass, ceramic, crystal, other meltable material, or a combination of meltable and unmeltable materials (i.e. plastic and wood or metal and ceramic). This technique is highly accurate and can typically achieve feature sizes as small as 150-300 μm. However, industrial additive manufacturing systems can be cumbersome to operate, often requiring workers to wear protective gear (e.g. respirators, safety glasses, special uniforms) while performing normal day-to-day tasks such removing 3D printed parts, cleaning the print chamber, or servicing wear items.

Some additive manufacturing systems have attempted to improve ease of maintenance and safety by sealing the 3D print in a box. The box can removed from the machine after the additive manufacturing system has finished printing. Unfortunately, forming a perfect seal between a printer and the sealed box can be difficult, and so some powder is always present outside of the print chamber. This may expose operators to inhalation hazard.

Additive manufacturing systems can also require significant time to remove 3D prints, clean, and service the printer before the next 3D print can be started. Even if the 3D print is sealed in a box, the print chamber may still need to be manually cleaned and any wear items (e.g. spreader blades, etc.) manually replaced and re-aligned. Since printing is an inherently dirty process (dirt in this context means soot, unused powder, weld slag, etc.), everything inside the print chamber, including the spreader blades, gas flow ductwork, glass windows, spreader drive mechanisms can get covered in dirt. As it is important to assure the purity of the print powder used, it is essential to fully clean out the print chamber and gas duct work before switching materials. This requires a deep cleaning typically involving taking apart many components so that dirt can be removed. This work cannot be done thru glove ports and can require use of specially trained labor wearing protective gear like respirators.

Another problem results from 3D prints that require an inert gas environment.

Whenever a print chamber is opened to atmospheric air it must be evacuated and purged. This process takes a significant amount of time and result in loss of expensive inert gasses. These activities can also require significant time, lowering additive manufacturing throughput since a new 3D print often cannot be started until cleaning and servicing completed.

Additive manufacturing systems can also require the 3D print to be removed from a controlled printing environment when the 3D print is removed from the print chamber. This can adversely affect 3D prints that require a heat treatment oven for post processing cool down and/or subsequent stress relief, annealing, or heat treatment. While additive manufacturing systems can pre-heat print plates and/or keep prints at a set temperature during printing in the print chamber, temperature control is often not available outside the print chamber. Unfortunately, when the 3D prints are removed from the print chamber, they are typically not temperature controlled and, in many systems, are also exposed to uncontrolled air. These factors can affect the material properties of the 3D print. Furthermore, 3D prints are often too hot to be immediately removed from the print chamber and so must remain in the print chamber for hours after they are done printing. This ties up the print chamber and prevents the system from starting new print jobs.

SUMMARY

A cartridge for a manufacturing system includes a sealable chamber having a bed and a laser transparent window. A powder hopper can be positioned within the sealable chamber. A powder spreader is positioned within the sealable chamber for distributing powder from the powder hopper onto the bed.

In some embodiments a laser transparent window is positioned to allow an external camera to focus on the bed within the sealable chamber.

In some embodiments a sealable chamber supports a camera to focus on the bed within the sealable chamber.

In some embodiments a wipe blade can be mounted within the sealable chamber to clean the laser transparent window.

In some embodiments a bellows is attached to the sealable chamber to hold the laser transparent window.

In another embodiment, a cartridge for a manufacturing system includes a sealable chamber having a bed and a laser transparent window. A powder hopper is positioned within the sealable chamber. A powder spreader can be positioned within the sealable chamber for distributing powder from the powder hopper onto the bed and an electronic memory attached to the cartridge to hold electronic information to identify the cartridge and control operation of a print station.

In another embodiment a cartridge for a manufacturing system includes a sealable chamber having a bed and a laser transparent window. A powder hopper is positioned within the sealable chamber. A powder spreader is positioned for distributing powder from the powder hopper onto the bed. A bellows can be attached to the sealable chamber to hold the laser transparent window.

In another embodiment a cartridge for a manufacturing system includes a sealable chamber having a bed and a laser transparent window. A powder hopper is positioned within the sealable chamber. A powder spreader is positioned within the sealable chamber for distributing powder from the powder hopper onto the bed and a wiper mechanism is configured to periodically clean the inside of the laser transparent window.

In another embodiment an additive manufacturing system includes a print station including a laser system and a cartridge attachment mechanism. A cartridge is attachable to the print station, the cartridge having a sealable chamber with a bed and a laser transparent window for passing through laser energy from the laser system of the print station. The cartridge further includes a powder hopper positioned within the sealable chamber.

In another embodiment an additive manufacturing system includes a print station including a laser system and a cartridge attachment mechanism. A cartridge is attachable to the print station, the cartridge having a sealable chamber with a bed and a laser transparent window for passing through laser energy from the laser system of the print station. The cartridge further includes gas inlet and outlet ports to allow control of cartridge gas environment.

In another embodiment an additive manufacturing system includes a print station including a laser system and a cartridge attachment mechanism. A cartridge is attachable to the print station, the cartridge having a sealable chamber with a bed and a laser transparent window for passing through laser energy from the laser system of the print station. An electronic memory is attached to the cartridge to hold electronic information to identify the cartridge and control operation of a print station.

In another embodiment an additive manufacturing system includes a print station including a laser system and a cartridge attachment mechanism. A cartridge is attachable to the print station, the cartridge having a sealable chamber with a bed and a laser transparent window for passing through laser energy from the laser system of the print station. The cartridge further includes a bellows attached to the sealable chamber to hold the laser transparent window.

In another embodiment an additive manufacturing system includes a primary and a secondary cartridge, with each cartridge having a sealable chamber with a bed and a laser transparent window for passing through laser energy system of the print station. A print station including a cartridge attachment mechanism for holding the primary and secondary cartridges is available, and a laser system is configurable to direct a first portion of light through the laser transparent window into the primary cartridge and further direct portions of light not used in the primary cartridge into the secondary cartridge through the laser transparent window.

In another embodiment an additive manufacturing system includes a print station including a laser system capable of providing a two dimensional laser image and having a cartridge attachment mechanism. A cartridge is attachable to the print station, the cartridge having a sealable chamber with a bed and a laser transparent window for passing two dimensional laser energy from the laser system of the print station.

In another embodiment an additive manufacturing system includes a plurality of printers and a plurality of cartridges able to be attached to the printers. At least one cartridge further comprising a sealable chamber having a bed and a laser transparent window. Another system is available for storing and moving the plurality of cartridges.

In some embodiments at least one cartridge of the plurality of cartridges has powder hopper and powder spreader positioned within the sealable chamber to distribute powder from the powder hopper onto the bed.

In some embodiments the system for storing and moving the plurality of cartridges further includes a cartridge storage rack.

In some embodiments at least one of the plurality of cartridges further includes an electronic memory attached to hold electronic information to identify the cartridge. A system for storing and moving the plurality of cartridges can position the cartridge based on the electronic information.

In some embodiments the system for storing and moving the plurality of cartridges is automated.

In some embodiments at least some of the printers, the cartridges, and the system for storing and moving the plurality of cartridges supports wireless communication therebetween.

In some embodiments powder is added or removed from a powder station.

In some embodiments at least one cartridge is inverted to remove powder at a powder station.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 1O illustrates print facility control of various stations;

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Figure 1A:
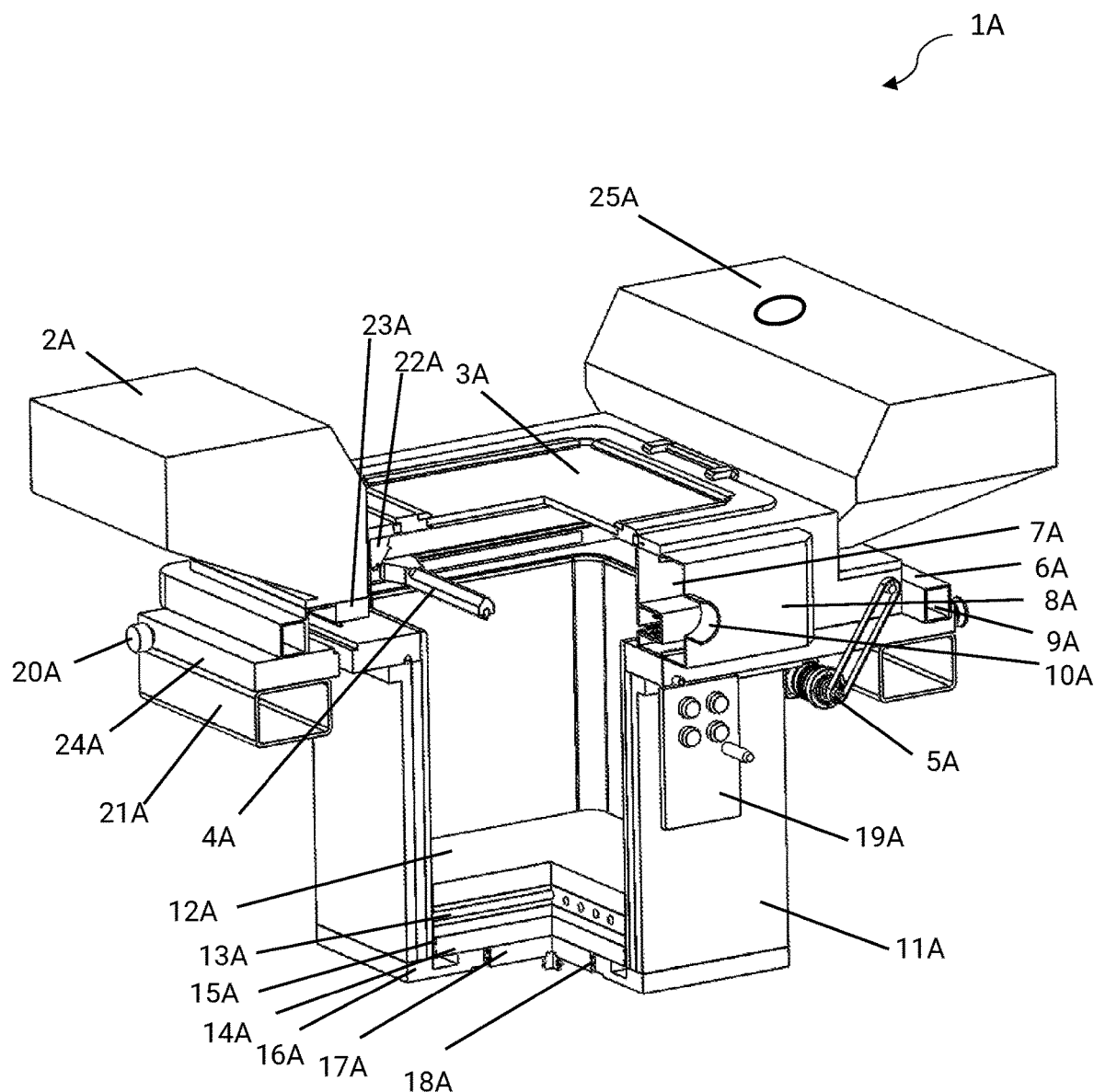
FIG. 1A illustrates a print cartridge for an additive manufacturing system in partial cross section.

FIG. 1A illustrates in partial cross section a 3D print cartridge 1A for an additive manufacturing system. The 3D print cartridge (hereinafter "cartridge") separates all of "dirty" printing functions from the rest of the system and the operator environment and is designed for replacement or removal. "Dirty" means wherever powder is present, processed for printing, or soot is generated. Whenever the cartridge 1A is connected to mating equipment such as a station (printer, de-powder, or storage) to be later described, the mating equipment can supply services required to operate the cartridge as needed based on which station it is mated to (e.g. the printer station allows full control of the cartridge while the storage station may only provide heating, power, and gas recycling, and use of the camera and lights). The cartridge 1A is designed to be sealed when disconnected from a mating station.

The cartridge 1A is built around a bed or base plate 24A. Fresh powder for a new print is stored in the powder hoppers 2A which can have the capacity to store all the powder needed for a full volume print. Fresh powder is metered onto the base plate 24A through the powder door 23A. Powder is swept across the plate by a powder spreader 4A using powder spreading blade(s). The powder spreader drive 5A moves the powder spreader back and forth across the print plate 12A.

A window 3A seals the top of the cartridge 1A against leaks of powder or gas and allows a laser beam (not shown) to pass through it to weld powder. The window 3A allows the access to the cartridge for loading print plates, unloading prints, cleaning and servicing the cartridge components (seals, spreader blades etc.). The inside of the cartridge 1A can be illuminated and imaged by the camera and lights 22A. The camera and lights can be either inside or outside the sealed chamber, or both, and can be positioned to take pictures and/or focus on scenes on the inside of the cartridge, in particular the print plate. The camera and lights can also be mounted on motion stages allowing the user to pan or zoom on items of interest during a print. This camera can be combined with secondary print diagnostics such as pyrometers, motion detectors, photodiodes, thermal cameras, or other sensors to automatically detect events and pan/zoom the camera to focus on the location of interest. In some embodiments, camera images can be viewed by the operator in an electronic or virtual window instead of directly viewing through a physical port or window in the cartridge.

Inert gas can be supplied to the cartridge by a gas supply duct 6A so that printing can be performed in whatever atmosphere is best for each print. The gas return duct 7A removes inert gas. The gas passes thru the HEPA filter 8A which removes impurities (soot, suspended nano particles of powder, etc.). The gas then travels to a gas recycler (not shown) which is installed on mating equipment. When the cartridge is disconnected from mating equipment, a gas supply port 9A and a gas return port 10A are sealed to preserve the atmosphere inside the cartridge. Gas is subsequently purified by removing oxygen, moisture, etc. by other equipment.

The Z-axis lowers the print plate after each layer is printed so that a new layer of powder can be spread and subsequently printed. A Z-axis frame 11A holds the Z-axis components in this design. The print plate (AKA build plate) 12A is where powder is welded during printing. The print plate heater 13A contains a heating mechanism for the print plate 12A (if desired) and can also insulate and/or cool a seal plate 14A. The seal plate 14A carries seals 15A, which confines the powder to the Z-axis frame 11A. The Z-axis bottom plate 16A closes off the lower end of the Z-axis frame 11A and has features to contain any powder that may slip past the seals 15A. The Plunger 17A has an interface so that it can remotely, automatically, and accurately interface with the Z-axis drive. A plunger seal 18A mates with the bottom plate 16A and further seals the cartridge 1A against powder and/or gas leaks.

An interface plate 19A contains all the inputs and outputs for the cartridge (compressed air, power, input and output signal, gas, cooling water, etc.). It is designed to make all these connections when the cartridge is connected to mating equipment. The interface can also contain a mechanism to electronically identify each cartridge when mated with mating equipment. Rollers 20A allow the cartridge 1A to be rolled onto the mating rails of mating equipment. Forklift tubes 21A allow the cartridge to be picked up and moved by a forklift or other transporter system.

In another embodiments, the interface plate can be configured to mate to various types or models of printers.

In one embodiment, drive components (such as motors, actuators, etc.) can be located in the mating stations and employ linkages to transfer power from the external drive components to driven components inside the cartridge. This will reduce the cost and complexity of each cartridge. For instance, the powder spread drive 5A, can be coupled to a linkage structure that is automatically connected when the cartridge is connected into the print station/engine through a gearing system, a belt system (shown in 5A), a magneto-restrictive, electrical, magnetic, inductive, hydraulic or other similar types of signal or energy transfer. Likewise, gas and fluid exchange between the cartridge and any compatible mating station could have external powder, fluid and/or gas pumps that would hook into the cartridge at either the interface panel 19A or other convenient locations that would allow transfer of powder (into hoppers 2A), fluid or gas without the need to over burden the cartridge with internal service transfer motors/pumps. Internal impellers (used to transfer powder and fluid) can be powered from external motors via aforementioned linkages.

Power coupling through the interface panel 19A can be electrical, inductive or optical with the latter two allowing for both power and communications to be transferred simultaneously. Additionally, diagnostic information from the various sensors built into the cartridge can occur via electrical, or optical methods.

In one embodiment, the cartridge 1A can include electronic identification such as an electronically readable memory 25A or other electronically readable indicia such as attached text, QR codes, or bar codes. The memory 25A can provide electronic information about the cartridge or cartridge components can be used to identify its make, model, type, powder type, or any other defining details about the unit, its sub-components, or their intended uses. This information can be used to inform a print engine about what material is to be printed, desired atmosphere (pressure and temperature), or other print related aspect so the print engine can adapt as needed to accommodate the print cartridge, or sub-assembly. The change induced could involve an action such as the automatic swapping of internal lens assemblies, adjustment of z-height/final optical throw of the lens assembly, laser parameter adjustment such as power per unit area, pulse shape, pulse duration, pulse repetition rate, wavelength, spatial pulse shape, tile size, spatial energy distribution within a tile, modify data diagnostics, data feedback algorithms, print process feedback algorithms, or algorithmic change to how tiles are put down during the print process. Electronic information from electronic memory 25A that is associated with a print cartridge can be read by a printer, de-powdering station, or storage rack to collect data on how much printing has occurred and other key metrics such as number of spreader cycles, z-axis adjustments, temperature cycles, pressure cycles, or other attribute that the cartridge has undergone along the way. This information can also be stored in a central database by the print station, one of the subsystems, the factory automation system, de-powdering station, cartridge storage station, the cartridge itself, or other mating/interfacing equipment.

Figure 1B:
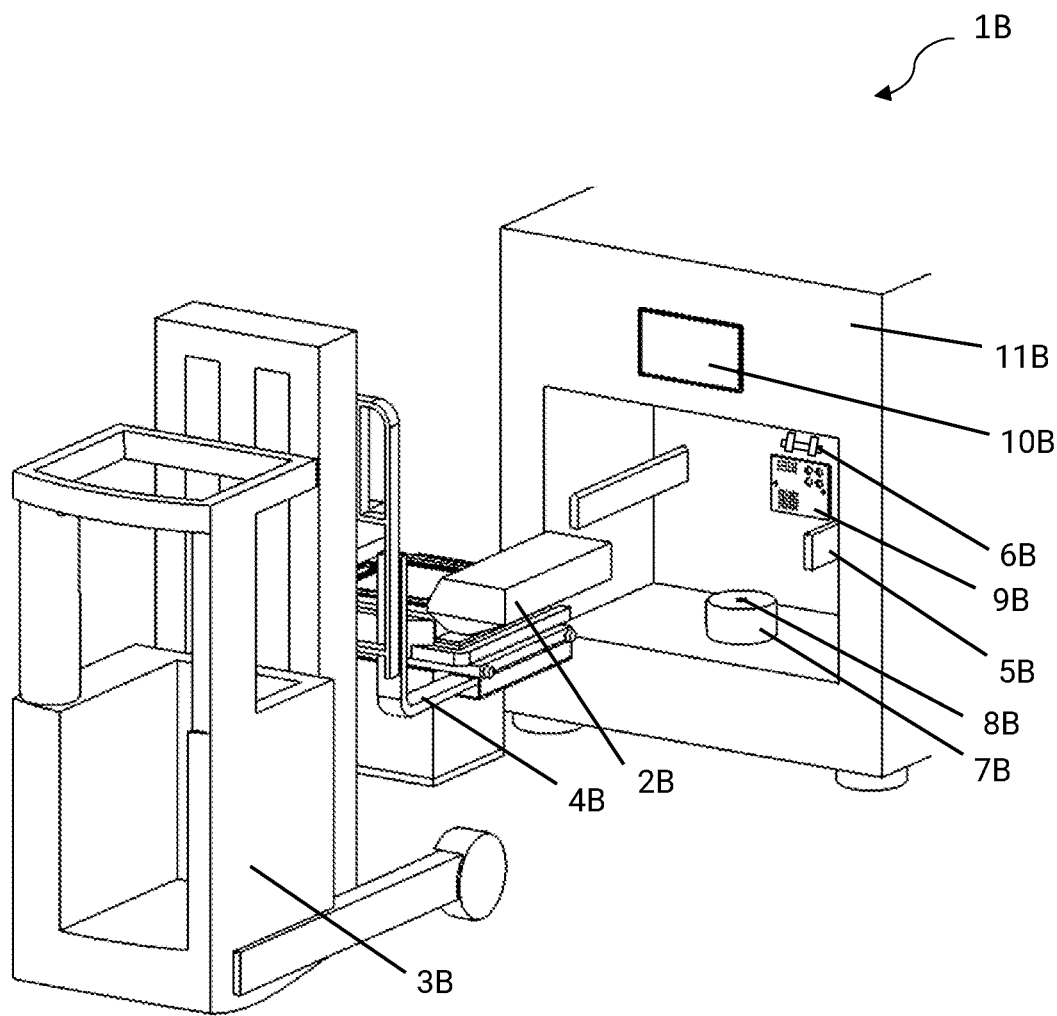
FIG. 1B illustrates a transporter of a print cartridge.

FIG. 1B illustrates one embodiment of an additive manufacturing system 1B that includes an embodiment of a cartridge 2B. As illustrated, cartridge 2B is being transported to a print station 11B on a custom transport fixture 4B carried by a transporter (represented here by a forklift 3B). The transporter could interface with the cartridge so that all or some of its services and functions are active, or a cartridge may be partially or fully disconnected from services and be non-functional while being carried by the transporter. As will be later described in more detail, the print engine 11B is a system module that contains a print station and a laser engine station. A cartridge 2B is ready to print when it has been prepared (i.e. is filled with fresh powder, has a new print plate installed, has had all the cartridge components inspected, refreshed and aligned, is filled with the appropriate gas, has a pre-heated print plate, etc.) in another piece of mating equipment such as the prep service station (not shown).

The transporter 3B aligns the transport fixture 4B with the mating rails 5B. Once aligned, the capture mechanism 6B pulls the print cartridge 2B into the print station 11B. The print cartridge 2B is aligned and locked into place inside the print station 11B. As the cartridge 2B is being pulled into place, its interface plate (similar to that described with respect to FIG. 1A) aligns with the print station interface plate 9B. When the cartridge 2B is locked into place, the interface plates are fully mated and services (compressed air, power, input and output signal, gas, cooling water, etc.) are provided to the print cartridge 2B. Locking into place can alternatively or in addition involve use of permanent magnets or electromagnets, pins, clamps, hooks, cables, ramps, air bearing, linear slides, linkages, or robotic end effectors. Additionally, hardware keying can be used as an additional safety measure against inappropriate action, for instance when reactive metals are loaded into a cartridge and assurance is needed that the atmosphere in the print station is appropriate to not cause an explosion. Additional or alternative keying can be used such as electronic, optical, and software as overlayed safety measures, and to prevent unauthorized use of the FRU independent from an approved Station.

Once mated, the Z-axis piston 7B rises to meet the z-axis plunger (similar to that described with respect to FIG. 1A). Once they are in contact, an automated clamp 8B connects the two. The cartridge Z-axis is now fully controllable by the print station 11B. The built-in optical diagnostics (camera/sensors) and lighting in the cartridge are now powered by the print station 11B and the diagnostic images/data can be displayed on the virtual window 10B, and/or anywhere else the print station is directed to send the image/data.

When a print is finished, the transporter 3B aligns the transport fixture 4B with the print cartridge 2B. A capture mechanism 6B pushes the print cartridge 2B so that it rolls out and unto the transport fixture 4B. The print cartridge 2B mates with and locks into place on the transport fixture 4B. The transporter 3B can now deliver the cartridge 2B to another station or piece of mating equipment. The print station 11B is immediately available so that another print cartridge can be loaded into place and the next print can begin with minimum down time between prints. Note that this second print cartridge may contain an entirely different printable material.

In this instance, the transporter (3B) is a human driven cartridge transporter, but in other embodiments, the transporter can be partially or wholly automated. In other instances, the partial or fully automated transporter can be guided by tele-presence cameras (remote operator), guided by embedded transponders, by simple or complex algorithms such as artificial intelligence, neural networks, deep leaning networks, neuromorphic processing, or other automated decision methods and aided by any number of optical or non-optical sensors.

In other embodiments, the module interfaces (6B) to the cartridge are the same height and the transporter 3B is made to interface and lock into the cartridge 2B without any height adjustment, eliminating the need for 'forklift-like' operation on the transporter 3B.

Figure 1C:
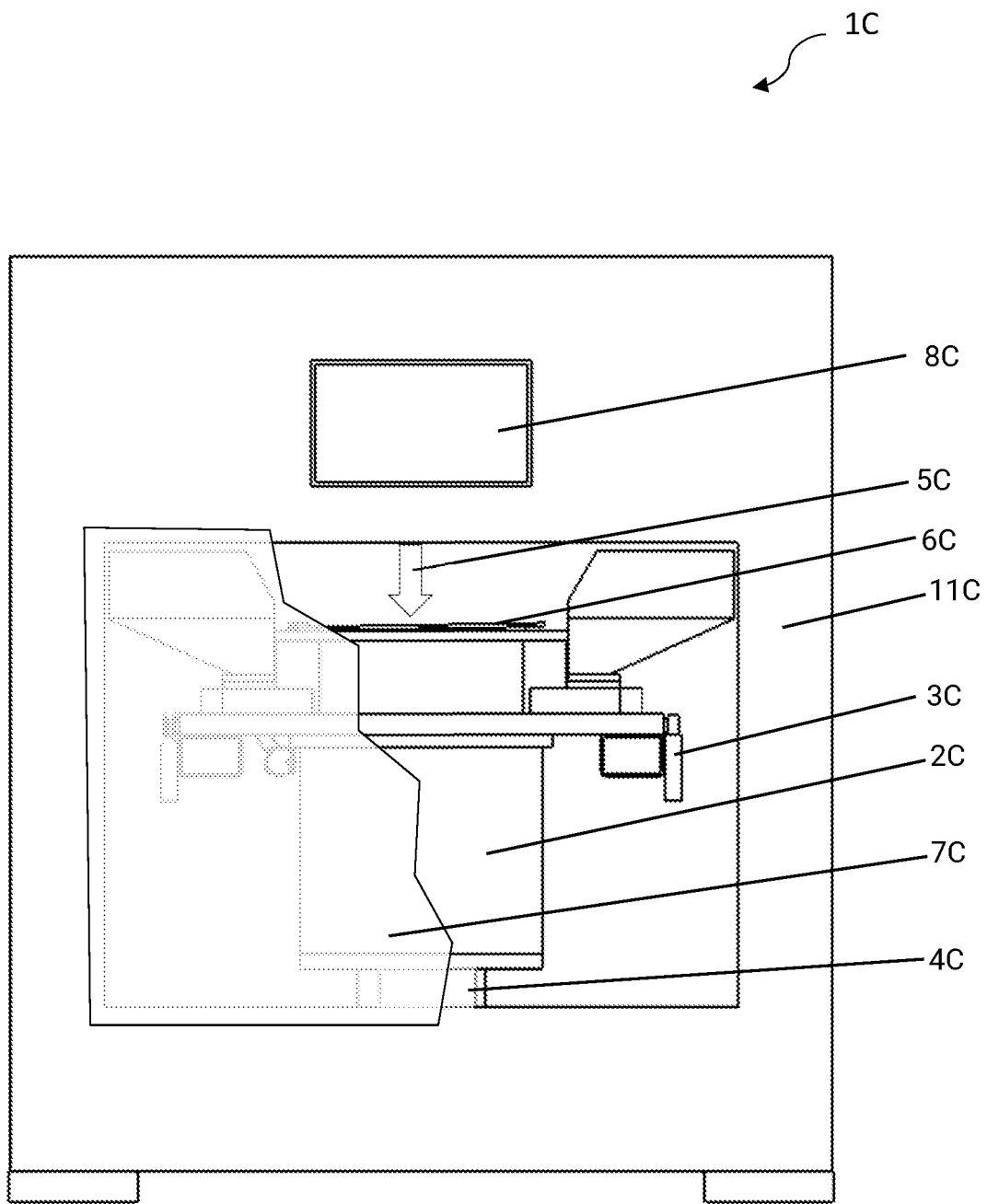
FIG. 1C illustrates installation of a print cartridge in a print station of an additive manufacturing system.

FIG. 1C illustrates one embodiment of an additive manufacturing system 1C with a front view of the print station 11C holding a print cartridge 2C during a print. The cartridge 2C has been aligned and is supported by the mating rails 3C. A Z-axis piston 4C has risen and is connected to the cartridge plunger (similar to that described with respect to FIG. 1A). A laser beam 5C exits the print station 11C, passes through the cartridge top window 6C, and welds powder into a printed part inside the cartridge 2C. The safety shield 7C prevents laser light from escaping the print station and protects operators from inadvertent contact with the print chamber 2C while printing. The operator can inspect the print by watching the camera image displayed on the virtual window 8C. Additionally, any diagnostic data such as imagery in the visible or invisible wavelength ranges, optical pyrometric or information derived from Laser Ultrasonic Imaging System (LUIS) or similar high speed imaging systems can be displayed on the virtual window 8C.

Figure 1D:
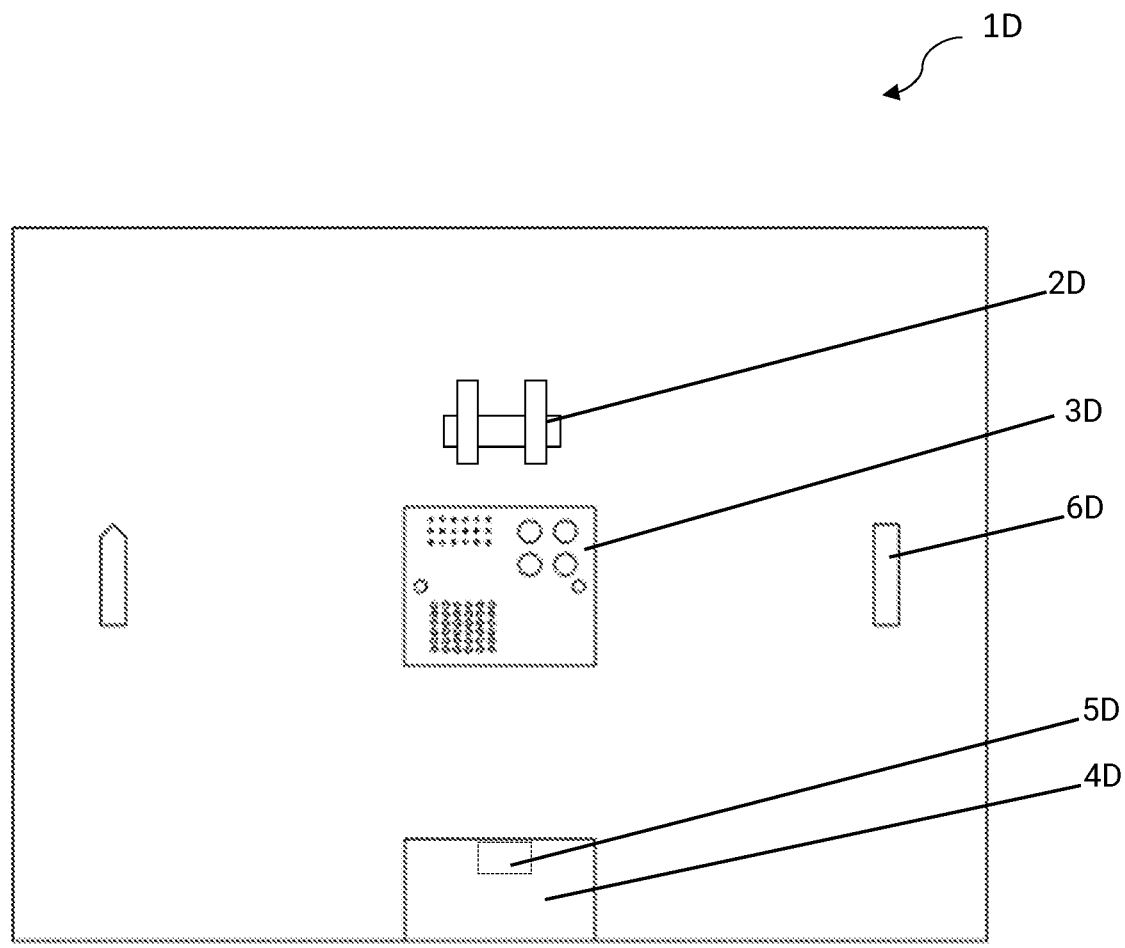
FIG. 1D illustrates a print cartridge interface.

FIG. 1D illustrates an example 1D of the front view of the standard cartridge interface. These interface features 6D can be incorporated into all mating equipment so that cartridges can be mated to each of them in the same manner. The cartridge mating rails 6D guide and support the cartridge. The capture mechanism 2D pulls the cartridge into the mating equipment and pushes it back out onto the transport fixture (similar to that described with respect to FIG. 1B). The size, materials, function, and location of these features can be standardized. A standard interface provides for maximum flexibility for customers to handle cartridges. Communications with any one module can be accomplished through interface panel 3D. In some embodiments, the communications can be accomplished using low or high frequency modalities or by hardware interfaces, Other methods could include RF, Wi-Fi, inductive, Ethernet, USB or Bluetooth. High frequency methods could include fiber, LiFi or free-space optical links. The hardware interfaces could include SIM, floppy, DVD, Laser DVD, holographic disk, or volume optical memory structures. The hardware modalities could be operator installed or have a transfer mechanism that would allow the cartridge to physically transfer one of the instruction storage modes from itself to a like receptacle interface on a module.

In other embodiments in which the cartridge is large (size of a cargo container), it will be very heavy. In these embodiments the cartridge is stationary, and a station is transported to the cartridge in which the same interface in FIG. 1D allows the station to be mated with the stationary cartridge.

Figure 1E:
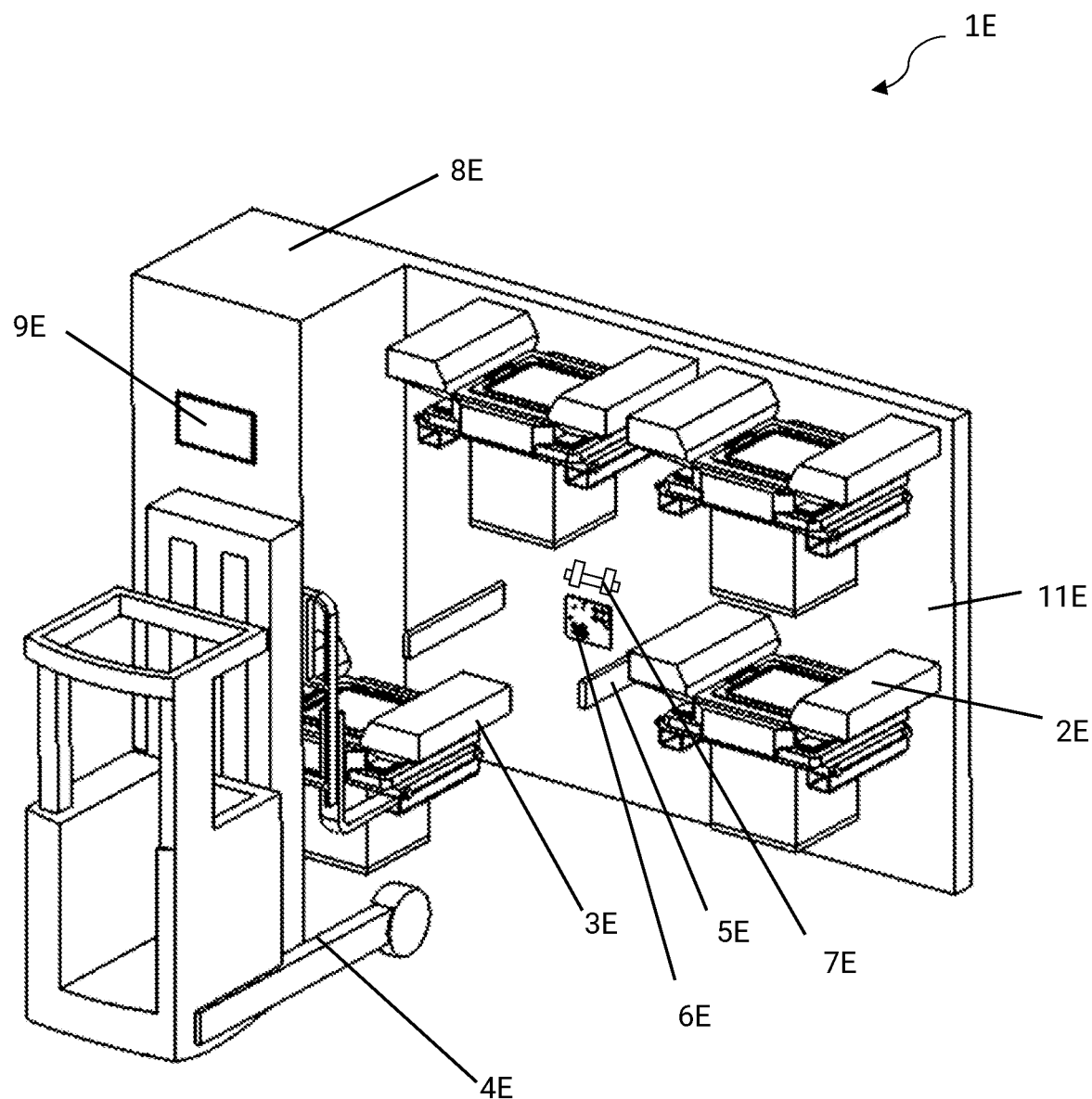
FIG. 1E illustrates a print cartridge storage rack.

FIG. 1E illustrates an example additive manufacturing system 1E including a storage station or rack 11E showing three cartridges 2E already installed. A transporter 4E is illustrated as transporting a fourth cartridge 3E to the rack 11E for storage. The rack 11E has four instances of the standard print cartridge interface comprising supports, mating rails 5E, an interface plate 6E, and the capture mechanism 7E. The rack 11E will have a facility station 8E which houses the means to supply each cartridge with services (compressed air, power, input and output signal, gas, cooling water, etc.) as needed. The facility station 8E can be configurable to allow customers flexibility in how they use the rack. The state of each cartridge 2E can be available on one or several monitors which will also serve as a virtual window 9E so that operators can view inside each cartridge.

The rack 11E provides a place to store cartridges. Unused or fresh cartridges may be stored here full of fresh powder and a new print plate, ready to be installed in a print engine to start a new print. The rack 11E can pre-heat the print plate and keep the cartridge full of gas as required by the print job that is assigned to the cartridge. Additionally, a cartridge that contains a newly completed print can be stored on the rack 11E while waiting to be post processed. The print can be kept at any temperature or have the temperature ramp up or down following a temperature profile. This could allow a print to be annealed or heat treated to relieve stress or achieve desirable mechanical properties. This could simply allow time for a print to cool down enough to be depowdered. The gas atmosphere could also be altered by introducing new gases or a mix of gases for instance, to achieve desirable mechanical properties. In other system embodiments, empty cartridges can be stored on storage rack 11E simply to keep them out of the way. Cartridges can be stored on the rack 11E in any state, including new and filled with powder, used and depleted of powder, or partially used.

Diagnostics built into the cartridge can continue to monitor the state of the print. These built-in diagnostics may include part, powder, and environmental temperatures, image diagnostics at multiple wavelengths, other modalities such as vibrational and ultrasonic imaging and LUIS volumetric mapping of printed parts. Any of the diagnostic information (imagery or data) can be shown on the virtual window 9E for any cartridge contained in the rack. Additionally, information for current and past cartridges can be sent to any other virtual window or to any user interface by the control system.

Figure 1F:
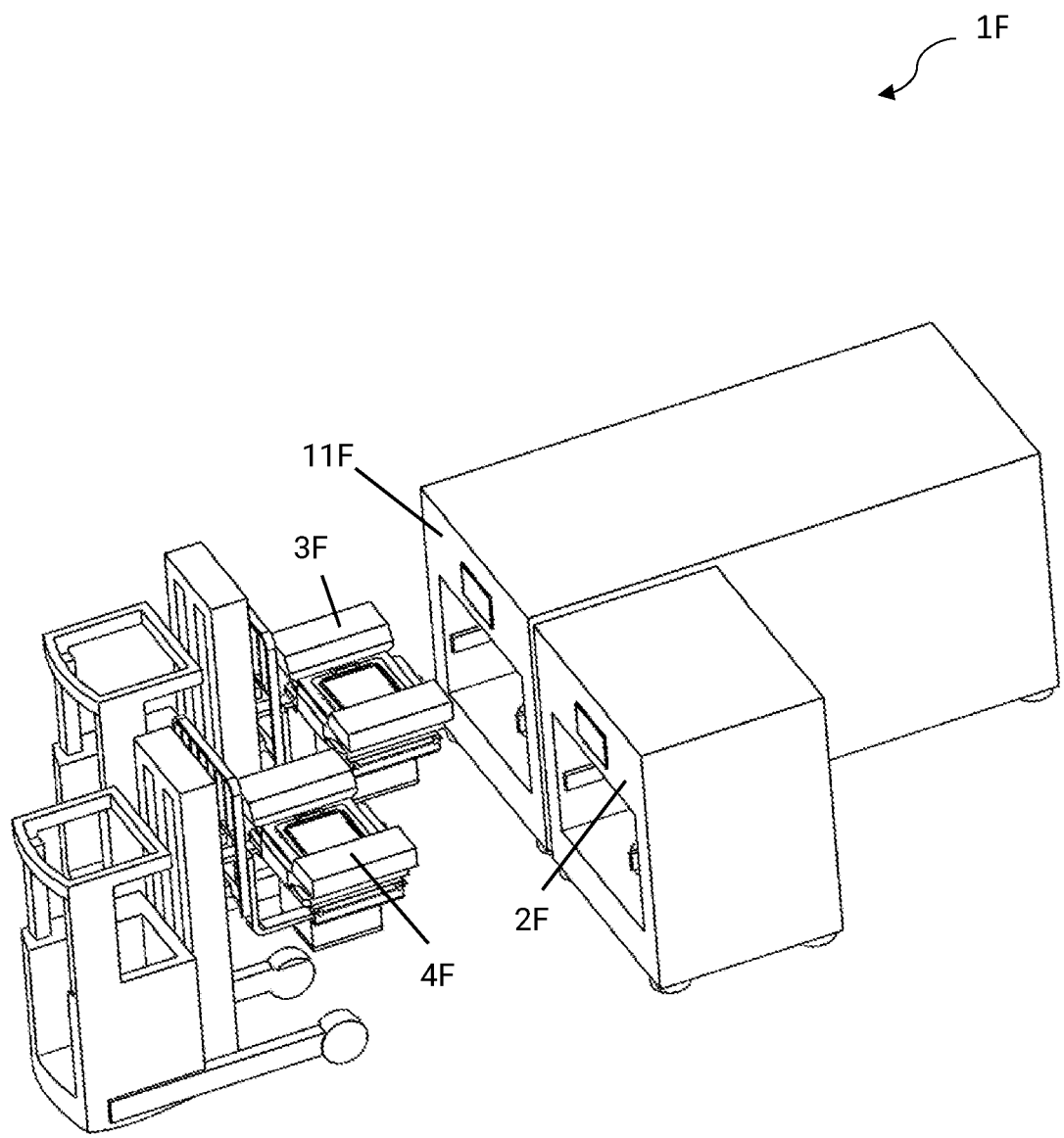
FIG. 1F illustrates use of an auxiliary print engine.

FIG. 1F illustrates an example of a print engine 11F with an auxiliary print station 2F attached. The print engine 11F can accept a print cartridge 3F. The auxiliary print station 2F can also accept a print cartridge 4F. The auxiliary print station 2F uses laser energy generated by the print engine 11F to print parts. The print engine can direct laser energy to either cartridge 3F or 4F when they are installed in their respective print modules 11F and 2F. The processing priority could be set to favor the cartridge 3F so that most of the laser shots are directed to it. During times where laser energy cannot be sent to the cartridge 3F (e.g. while spreading powder, or un/loading a print cartridge), energy can be directed to cartridge 4F, assuring maximum usage of the print engine's 11F lasers.

Figure 1G:
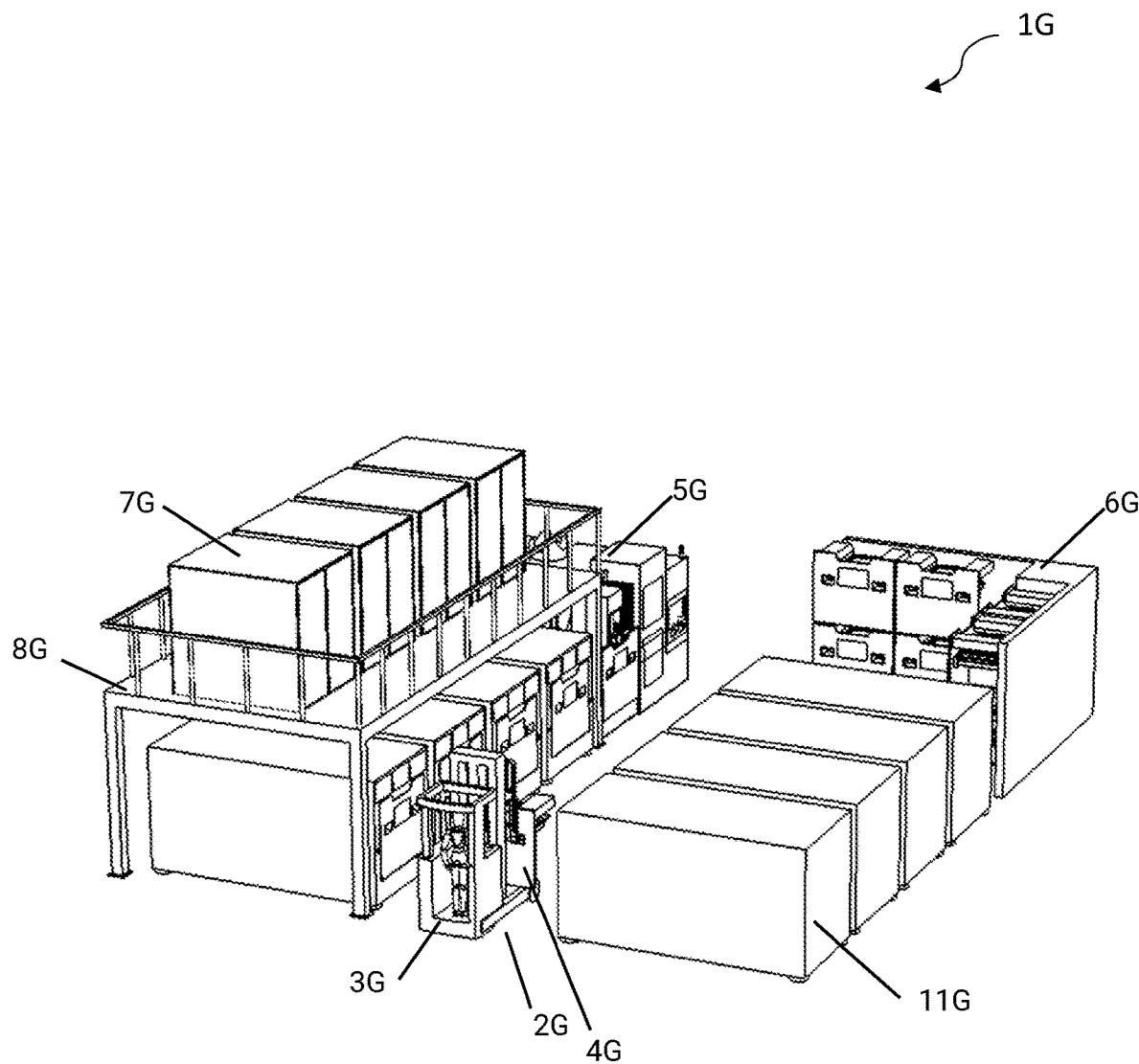
FIG. 1G illustrates an 8 system work cell factory layout.

FIG. 1G illustrates an alternative embodiment of an additive manufacture system 1G. Multiple print engines 11G are located close together on a shop floor. A service aisle 2G allows a transporter 3G to transport print cartridges 4G between the print engines and the powder station 5G, the rack 6G, and any other piece of mating equipment. The facility stations 7G may be located on a mezzanine 8G to save floor space. The printer is especially suited to this type of multi-unit factory layout due to its low cycle time and fast printing speed. This layout provides a cost efficiency as the mating equipment can be shared among many print stations/engines. In some embodiments, various types of communication between cartridges, print engine, powder stations, and racks is possible. In other embodiments, identifying information on the cartridge can be used to direct automated, semi-automated, or manual positioning of the cartridges at the appropriate print engine, powder, or storage modules. The communication types that can be used include low and high frequency methods including RF, Wi-Fi, Inductive, Ethernet, USB, Bluetooth (low frequency types), fiber, LiFi, FSO (high frequency types). Additionally, this information can be transferred from cartridge to mating stations using physical media hardware such as SIM, floppy, DVD, Laser-DVD, holographic-disk, or volume optical media.

Figure 1H:
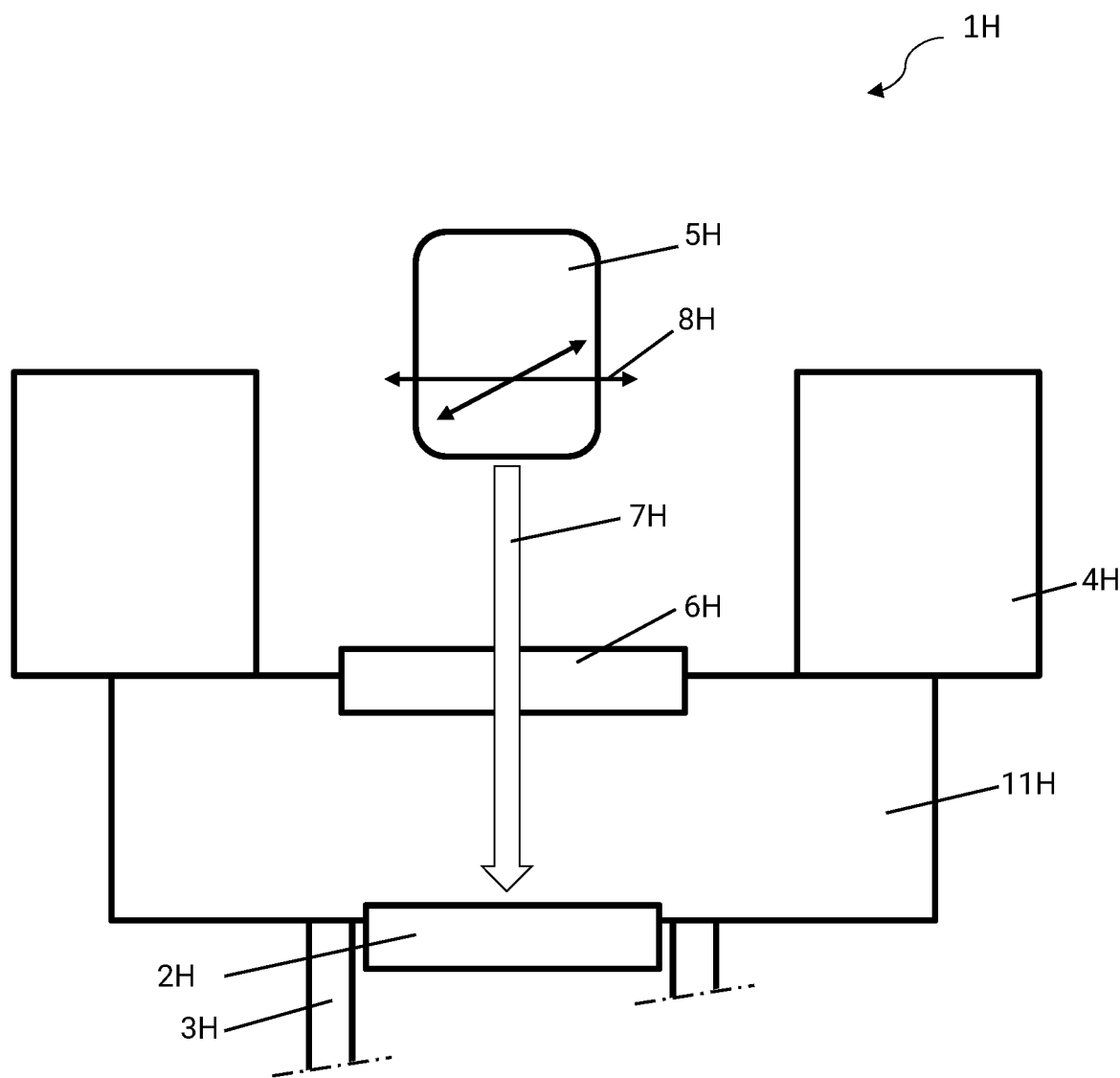
FIG. 1H illustrates an alternative embodiment of a print cartridge able to interact with an X-Y gantry that can traverse an entire area of a print plate in the print cartridge.

FIG. 1H illustrates an alternative embodiment of an additive manufacture system 1H. A print chamber 11H has a fixed window 6H located at the top of a chamber. A print head 5H can be mounted to an X-Y gantry such that is can traverse the entire area of a print plate 2H. This motion is represented by the arrows 8H. The laser beam 7H is projected from the print head, passes thru the window 6H, and welds powder into metal parts on the print plate 2H. The window must be large enough—roughly as big as the print plate—so that the laser can be directed to the whole area of the print plate. The powder hopper 4H and Z-axis wall 3H are shown for reference.

Figure 1I:
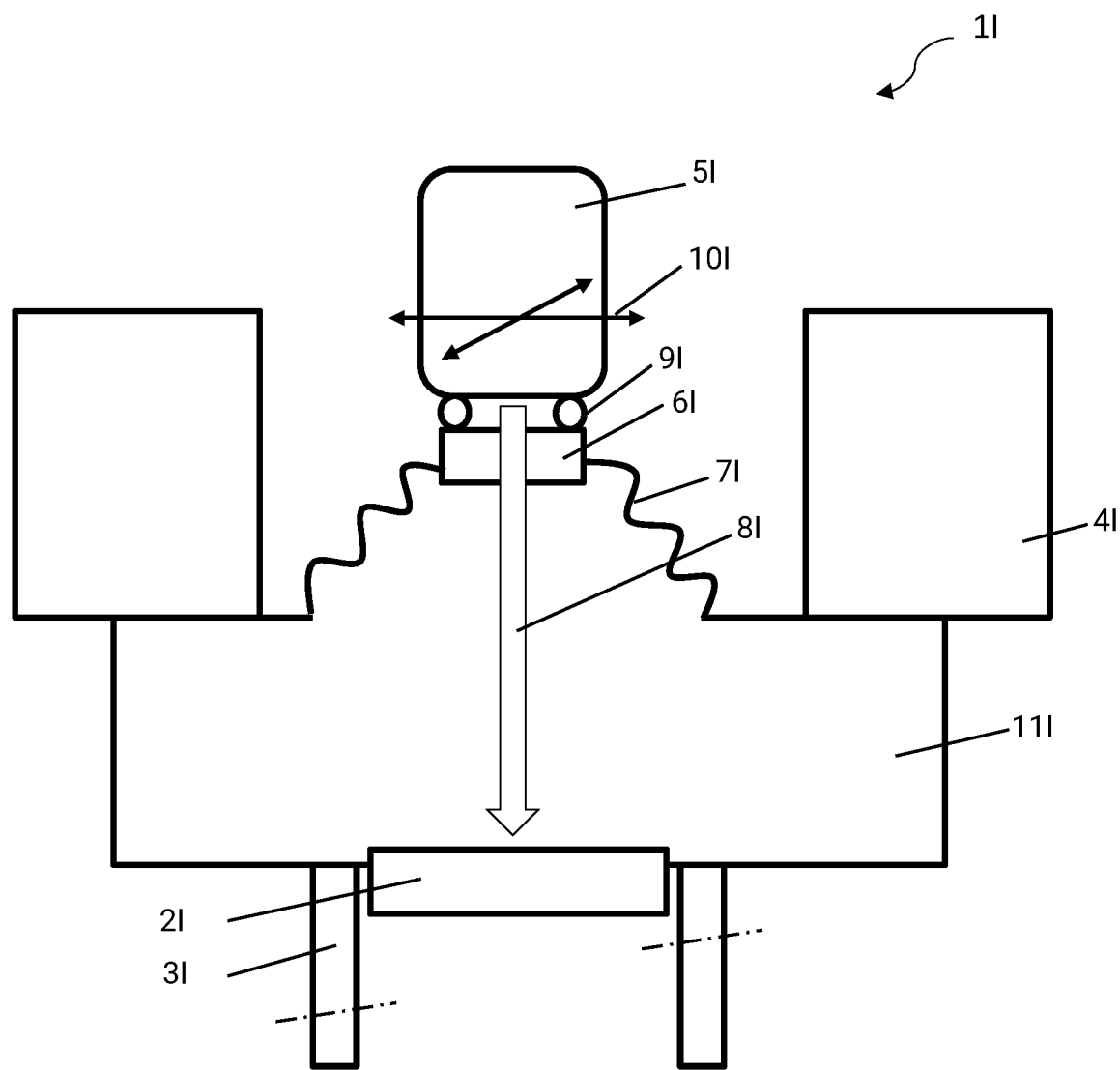
FIG. 1I illustrates an alternative embodiment of a print cartridge with a bellows connection.

FIG. 1I illustrates an alternative embodiment of an additive manufacture system 1I. In this embodiment a print chamber 11I includes a window 6I which is mounted to a bellows 7I such that the window is free to move in the X-Y plane (indicated by 10I). After the cartridge is installed in the print engine, the window 6I is affixed at position 9I using clamps, magnets, kinematic mounts, or other suitable attachment mechanism to the print head 5I (this could be done manually or automatically). The print head 5I is mounted to an X-Y gantry such that it can traverse the entire area of the print plate 2I. This motion is represented by arrow 10I. Because they are attached, the window 6I will move with the print head 5I. The laser beam 8I is projected from the print head, passes thru the window 6I, and welds powder into metal parts on the print plate 2I. In this embodiment, the window 6I can be significantly smaller than the print plate 2I, because it will be carried around the whole area of the print plate. The powder hopper 4I and Z-axis wall 3I are shown for reference.

Figure 1J:
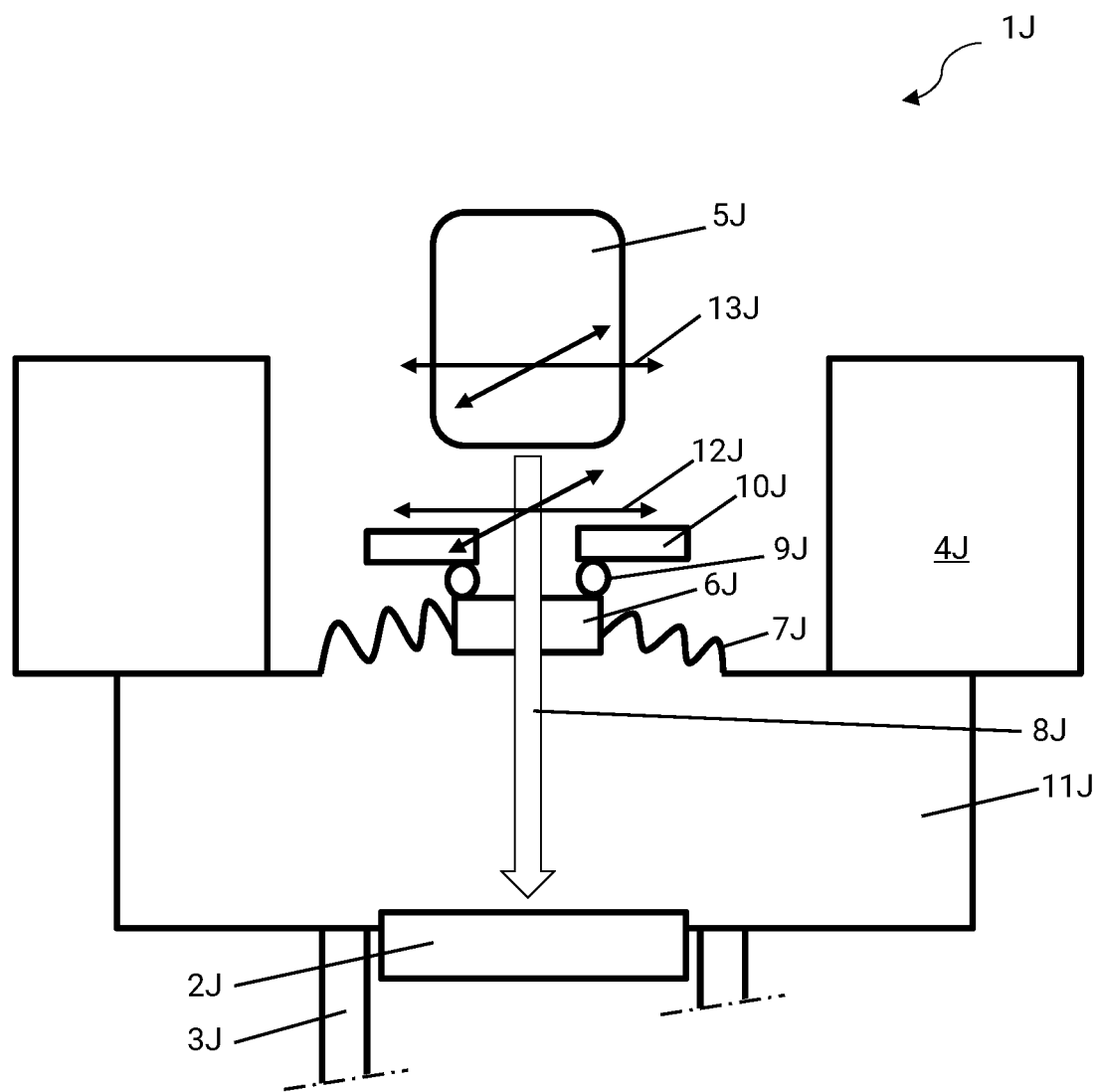
FIG. 1J illustrates an alternative embodiment of a print cartridge with a bellows connection and a secondary X-Y gantry.

FIG. 1J illustrates an alternative embodiment of an additive manufacture system 1J. The print chamber 11J has a window 6J which is mounted to a bellows 7J such that the window is free to move in the X-Y plane. After the cartridge is installed in the print station, the window 6J is affixed at position 9J using clamps, magnets, kinematic mounts, or other suitable attachment mechanism to a secondary X-Y gantry 10J which is attached to the print station (alternately, the secondary X-Y gantry could be part of the print cartridge). The secondary X-Y gantry can be much cheaper and lighter than the print head X-Y gantry as it has very relatively little weight to support and does not have to move as fast or as accurately as the print head X-Y gantry. The print head 5J is mounted to an X-Y gantry such that it can traverse the entire area of the print plate 2J. This motion is represented by the arrows 13J. A print station system controller can direct the secondary gantry 10J to move in unison with the print head 5J. The laser beam 8J is projected from the print head, passes thru the window 6J, and welds powder into metal parts on the print plate 2J. In this embodiment, the window 6J can be significantly smaller than the print plate, because it will follow the motion of the print head over the whole area of the print plate. The powder hopper 4J and Z-axis wall 3J are shown for reference.

Figure 1K:
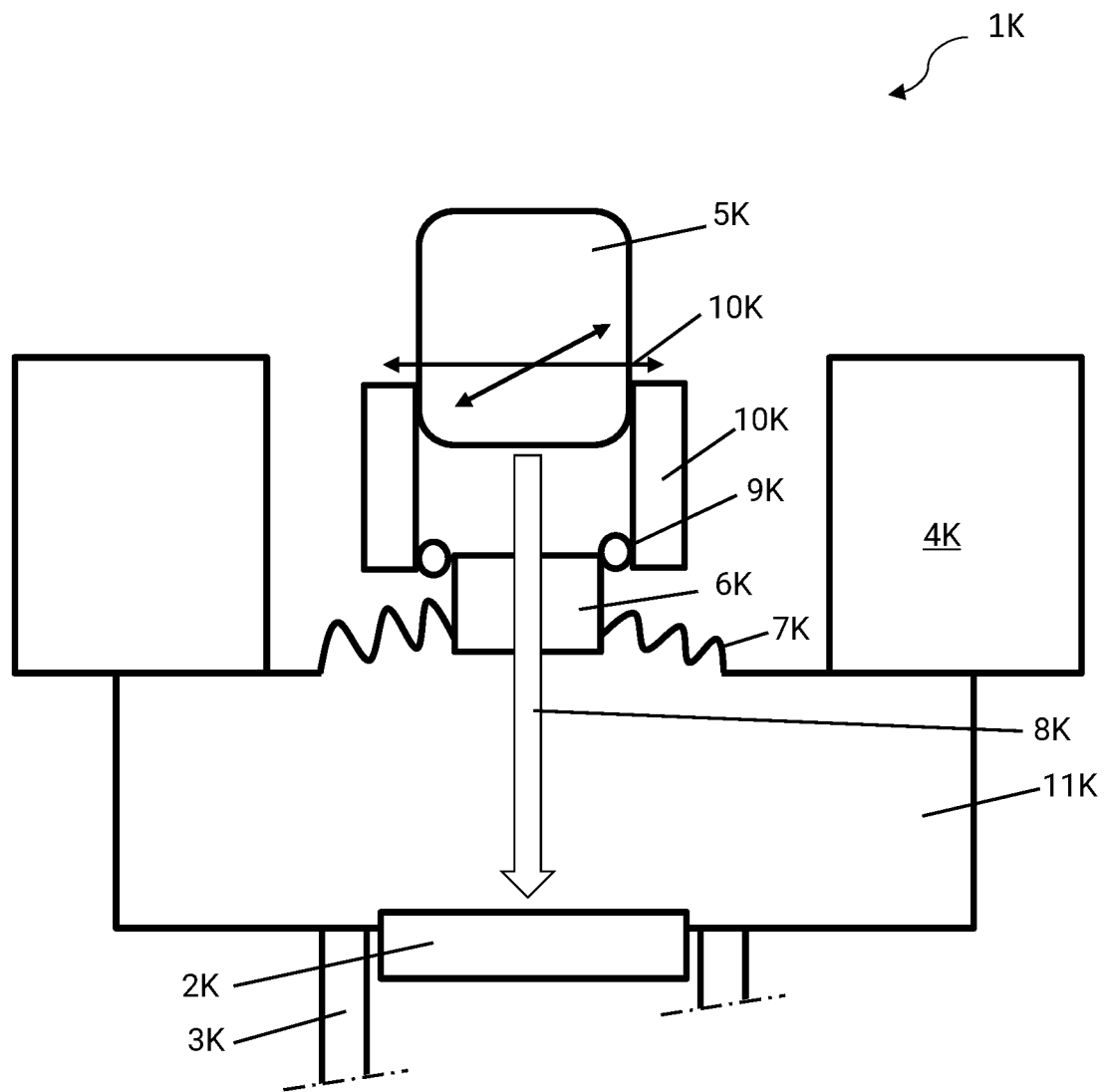
FIG. 1K illustrates an alternative embodiment of a print cartridge with a bellows connection and a print head connected to push and move a window.

FIG. 1K illustrates an alternative embodiment of an additive manufacture system 1K. This embodiment is similar the embodiment illustrated with respect to FIG. 1I except the attachment 9K is more flexible, and the print head pushes and moves window 6K. In this embodiment, a mechanism supports the window 6K against the force of gravity so that the window does not sag.

Figure 1L:
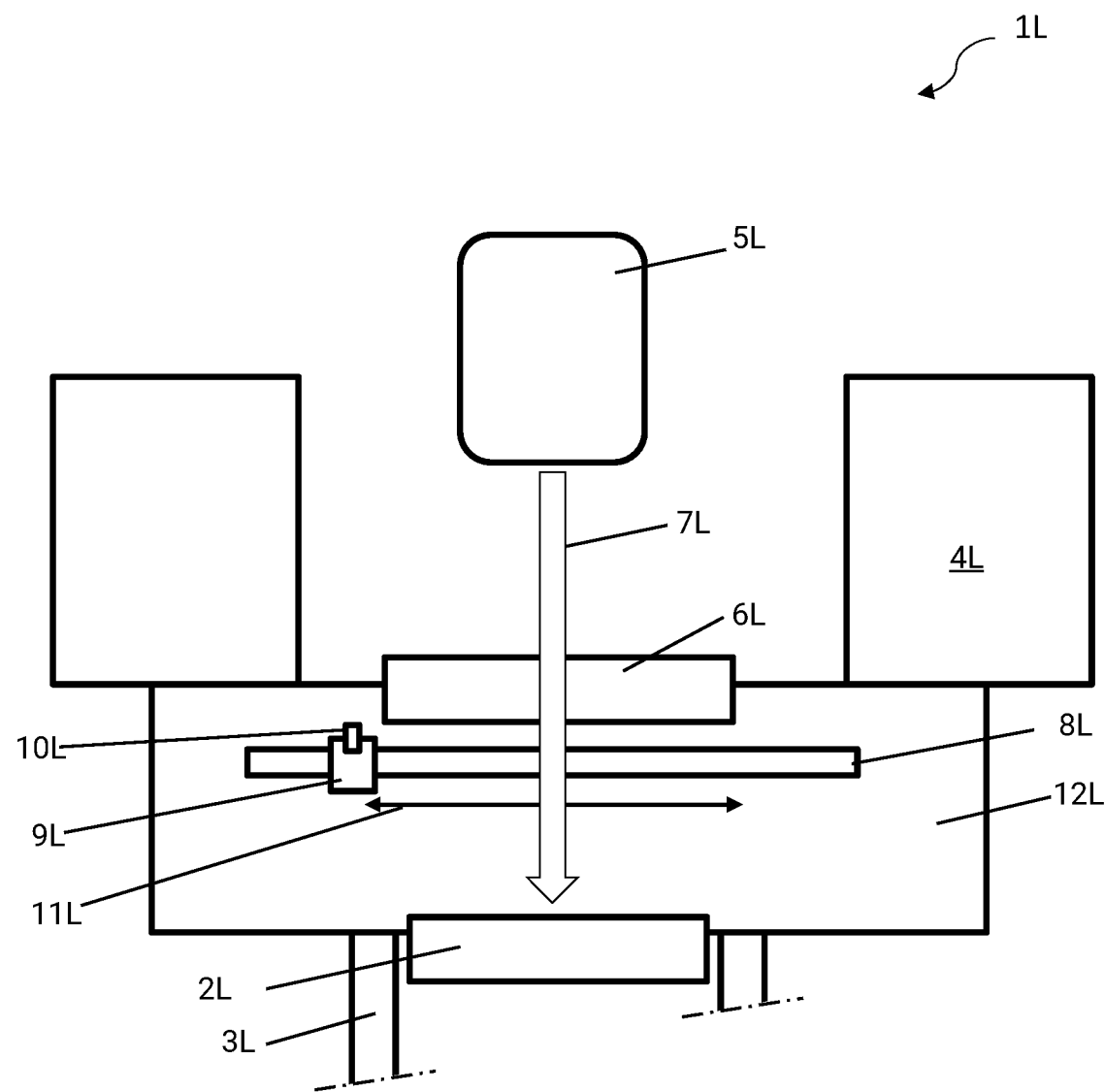
FIG. 1L illustrates a concept for wiper blades keeping the laser input window clear.

FIG. 1L illustrates an alternative embodiment of an additive manufacture system 1L. This embodiment is similar the embodiment illustrated with respect to FIG. 1H except the window 6L is periodically cleaned by wiper 10L which is attached to carriage 9L. The carriage rides on rail 8L and is driven past the window 6L. Each pass of the wiper cleans the window surface of accumulated dirt, which allows the laser energy 7L to pass unimpeded thru the window. In some embodiments, the wiper can be a cloth-like material which is either dry or soaked in a solvent and then quickly wiped against the interior window of the cartridge. In other embodiments the wiper can be made from a bristle-brush configuration with soft bristles that do not harm or scratch the window but are stiff enough to allow wiping away any powder. In some embodiments, the wiper could be a gas jet (e.g. air knife) for non-contact cleaning. In some embodiments, the wiper could be a gas or liquid sprayer or a combination of such a sprayer and physical wiper. After cleaning the window, the wiper can be cleaned by gas jets, wiping it against a specialized or roughened surface to dislodge any powders, or cleaned by a solvent or bath in a separate cleaning area. In some embodiments, the wiper could be replaced when dirty. In some embodiments, the dirty part of the wiper could be moved to expose a fresh part of the wiper. In some embodiments the wiper is made from cotton, polyester, wool, carbon fiber strands, Kevlar, fiberglass, aluminized fabric, ceramic fabric, silica fabric, or other suitable material.

Figure 1M:
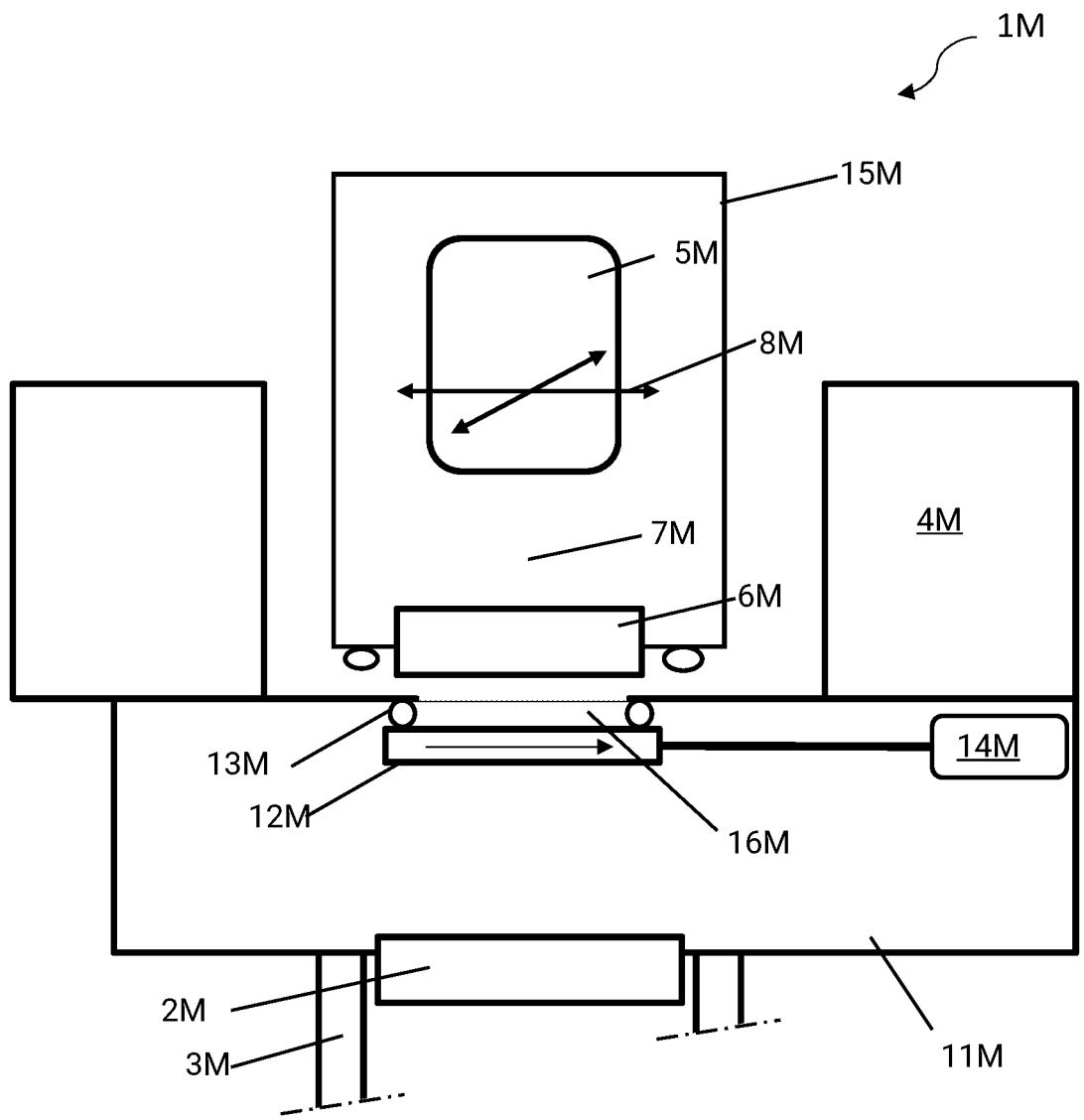
FIG. 1M illustrates an alternative embodiment of an additive manufacture system with a fixed window.

FIG. 1M illustrates an alternative embodiment of an additive manufacture system 1M. A print head 5M can be mounted to an X-Y gantry such that it can traverse the entire area of a print plate 2M. This motion is represented by the arrows 8M. A print chamber 11M has an aperture 16M located at the top of a chamber. The aperture can be closed by a sliding door 12M and sealed to the ambient environment with seals 13M. The door can be opened or closed with an actuator 14M. The print station 15M has a fixed window 6M that seals the print station from the ambient environment.

Figure 1N:
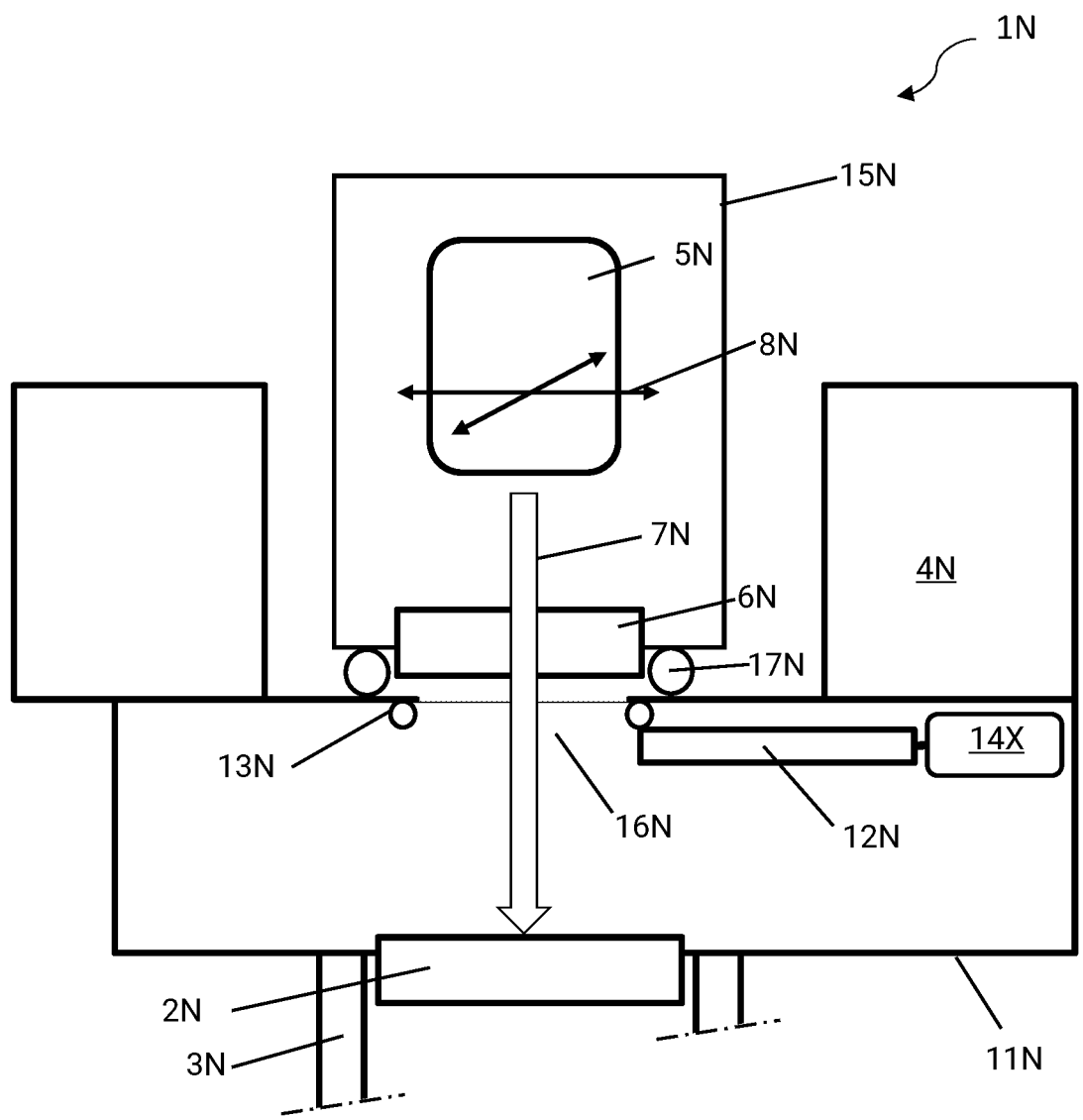
FIG. 1N illustrates an alternative embodiment of FIG. 1M in an open position.
Figure 10:
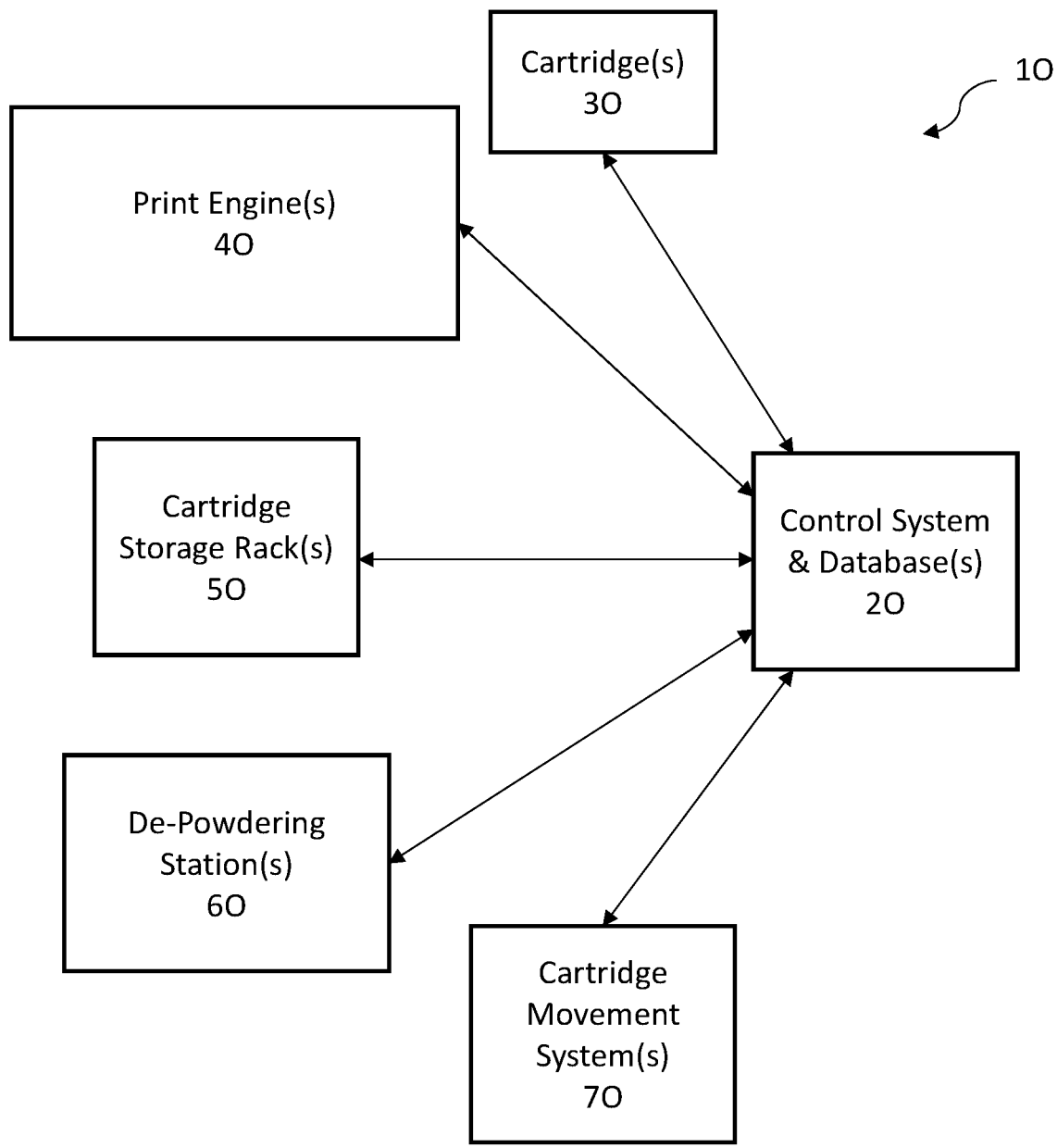

FIG. 1N illustrates the "open" position of alternative embodiment of an additive manufacture system 1M. The print station 15N expands seals 17N against the top of the print chamber to seal the chamber from the ambient environment. The door 12N may then be opened by actuator 14N leaving aperture 16N open. The laser beam 7N is projected from the print head, passes thru the window 6N, and welds powder into metal parts on the print plate 2N. The window must be large enough—roughly as big as the print plate—so that the laser can be directed the whole area of the print plate. In this embodiment, the window 6N is fixed to the print station 15N, making the print chamber 11N less expensive. The powder hopper 4N and Z-axis wall 3N are shown for reference.

FIG. 1O illustrates an additive manufacturing system 1O that includes print facility control system and database(s) connectivity 2O that connects to various stations of a print facility. The control system and database(s) 2O communicates with the cartridge(s) 3O, the print station(s) 4O, the rack(s) 5O, the de-powdering station(s) 6O, the transporter (cartridge movement system(s)) 7O, and the facility station 8O. Each of the components can give status updates and be real-time re-configured to optimize the facility operation.

Figure 1P:
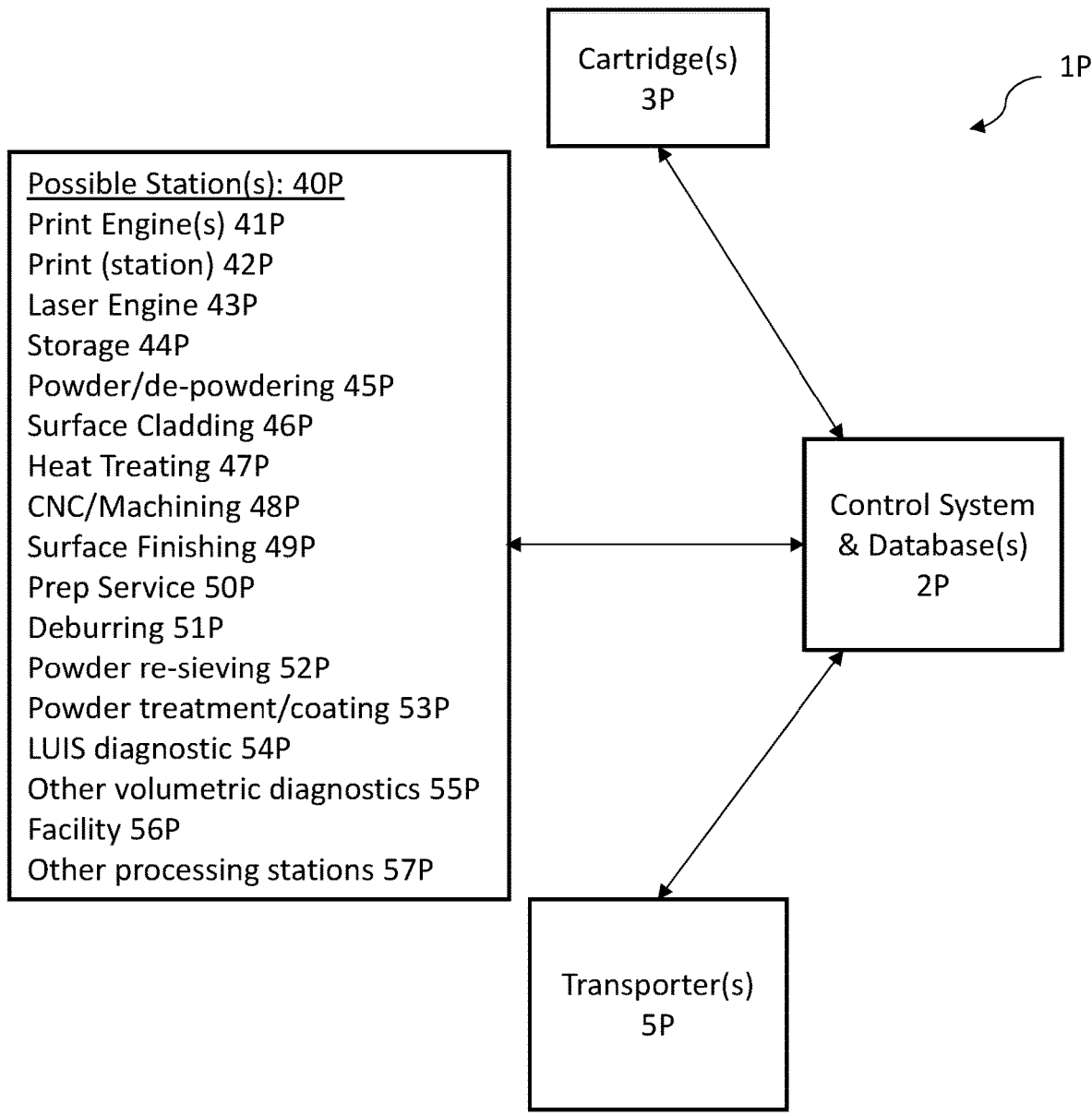
FIG. 1P illustrates print facility control of possible stations.

FIG. 1P illustrates an additive manufacturing system 1P that includes a variety of other potential stations that could be part of an additive manufacturing system, 1P. In some embodiments a cartridge is loaded into a station. An example of a station would be the cartridge-equipped print station in which energy (laser or electron beam) is delivered into it from a laser engine (station) to enable it to print a part. Typically, a laser engine is only used in conjunction with a print station to turn the combination into a print engine. The stations can be arranged and connected to each other to form a manufacturing system. A manufacturing system may contain many cartridge-equipped stations, and support stations captured in a frame arrangement, coordinated by a control system and which takes print instructions from the user in order to fulfil print orders/jobs. These other functional stations can contain dirty processes to reduce human exposure in making a 3D part. As mentioned before, 3D printing is of itself messy, equally messy is the pre- and post-processing of the cartridge, post-processing of the powder and post processing of the printed part. Additionally, the cartridge system interface for interaction with various diagnostics systems. The control system and database(s) 2P would communicate with the cartridge separately or when it is connected to any one of the listed station(s) 40P or while it is being manipulated by the transporter 5P. The station(s) listed is not an all-inclusive list but do include the print engine 41P (composed of a print station 42P and a laser engine 43P), a storage (rack) station 44P, a facility station 56P, and a powder prep/de-powdering station 45P. The powder prep station could be one station for prepping a cartridge which would include removing powder from a cartridge that already had undergone printing. These two functions (prepping a cartridge and powder removal) could be done in one station or two separate in which case the prepping station could be called 'prep' while the other could be called 'de-powdering'. The other stations can include surface cladding station 46P, heat treating station 47P, CNC/machining station 48P, surface finishing station 49P, a prep service station, a de-burring station, a powder re-sieving station 52P, a powder surface treatment/coating station 53P, the LUIS diagnostic station 54P, other volumetric and surface diagnostic station 55P, and other processing station 56P. The laser engine 43P mates to and interacts with the print station 42P (to form a print engine 41P), the surface cladding station 46P, the LUIS diagnostic station 54P, and may interact with heat treating station 47P and the surface finishing station 49P.

The print station 42P, the surface cladding station 46P, the heat-treating station 47P, the CNC/machining station 48P, the surface finishing station 49P, and the deburring station 51P does post processing on the printed part. The surface cladding station 46P in conjunction with the laser engine 43P operates on the printed part to add a functional layer to selected surfaces as in the case of drill bits, airfoil surfaces, turbine blades or medical implants. The heat-treating station 47P, in conjunction with the laser engine 43P can perform surface annealing and hardening or it can do this form of post processing using other traditional methods such as standard thermal sources or directed energy non-laser sources. The CNC/machining station 48P performs standard subtractive manufacturing on a printed part for final figure and form. The surface finishing station 49P can interact with the laser engine 43P to perform surface smoothing via mass transport/surface tension, or laser peening/hardening. The surface finishing station 49P can also be performed in more traditional subtractive methods as well (this would not require coupling 49P to 43P). The deburring station 51P would use traditional subtractive machining methods to enhance surface finish of the printed part. The LUIS diagnostic station 54P would couple with the Laser Engine 43P (configured with FRUs specifically for LUIS) to volumetric scan the printed part to ensure print accuracy, density, and defect statistics. Additionally, LUIS and other volumetric diagnostics (54P and 55P, respectively) can be used in conjunctions with a storage station and Laser Engine to determine functionality of the printed part under conditional environments such as high or low heat, high pressure or partial vacuum, or other environmental or operation extremes to ensure the printed part can withstand static operational performance requirements.

The prep service station 50P is used to service the cartridge and may be used in conjunction with the powder station 45P and facility station 56P. In the prep station, consumables (such as the blade 4A, build plate 12A, and HEPA filter 8A in FIG. 1A) are replaced in a manner to minimize human interaction with the dirty environments. Gases and fluids are removed for post processing via the facility station 56P. Used powder is removed and transferred to the powder re-sieving station 52P for powder recovery.

The powder treatment/coating station treats the powder for chemistry or emissivity enhancements, this would depend on which powder/metal is being used but could include chemical or oxide treatment to enhance emissivity (such as increasing the absorption of copper or steel by surface treatment of the powder) of by adding chemical dopants to the powder for special print parameters.

Other volumetric diagnostics station 55P would include x-ray tomography, surface scanning imaging, high resolution surface and thermography imaging to name a few in which the printed part is manipulated while minimizing handling damage and not exposing the human to dangerous metrology methods (as in the x-ray tomography case).

The other processing stations would allow customer needs to be met using by isolating potentially dangerous process, test or diagnostics processes from workers and/or the printed part.

Advantageously, the described additive manufacturing system describes a cartridge that contains the whole print chamber and all its components. The cartridge can be transported between mating equipment. Use of cameras and a virtual window eliminates the need to have a physical window. In one embodiment, a display screen can allow remote inspection of a cartridge. Laser light can pass through a top window to weld, preheat, heat-treat, or provide other thermal operations on the powder. Laser light can be directed to auxiliary print print stations to take advantage of laser shots that would otherwise be wasted and increase manufacturing throughput.

Other advantages for the described additive manufacturing system are based on use an electronically readable memory for cartridges such that data can be stored or associated with its intended use. Cartridge design can use a standard interface to mate the cartridge to mating equipment. Electronically readable memory on the cartridge can inform actions to take on the print engine before, during, or after the print process. Mating equipment can read and or write information to the electronically readable memory. Operators can access electronically readable memory with a handheld unit. The storage rack can supply services to the cartridge and assign information to the electronically readable memory or used to heat treat prints before they are removed from the print plate.

The described additive manufacturing system protects workers by isolating them from hazardous printer byproduct materials (metal powder, soot, weld slag, inert gases, etc.), with the printer byproduct materials being contained inside a print cartridge. All machine components that are exposed to printer byproduct materials are removed with the cartridge, and the cartridge can be opened inside a dedicated powder handling station. This arrangement limits opportunity for printer byproduct materials to escape into the factory environment. When a cartridge is installed in a powder or prep station, workers have full access to service all of the cartridge components through glove ports, so workers never have to don special protective gear to service a cartridge. Alternately, the powder or prep station could be installed in a clean room and workers would wear respirators and protective clothing to service the cartridge. This scheme will isolate all of the dirt to the clean room, eliminating exposure of the rest of the factory.

Another advantage of the described additive manufacturing system is that printer uptime is increased by reducing idle time between prints. When a print completes, operators can remove the print cartridge, immediately install a new cartridge and start a new print. The idle time between prints is reduced from hours to minutes. Print cartridges can be cleaned, serviced, and charged with fresh powder and new print plates off-line in the prep station. The work is done in a sealed environment so that the print chamber and powder are never exposed to air, high humidity, or factory contaminants. Fresh cartridges can be prepared in advance to meet a customer's production schedule. Fresh cartridges are placed in the storage rack where they can be pre-heated, chilled, pressurized, or de-pressurized in whatever gas atmosphere is required. When a space opens up on a printer, any fresh cartridge is be plugged in and the print starts immediately, as there is no wait time for it to be preheated or purged of atmospheric gasses.

Another advantage of the described additive manufacturing system is that it allows the printer to create a print in any material (metals such as steel, aluminum, Inconel, titanium, wood, glasses, or ceramics) and then as soon as that print is completed, print any other material with little or no down time for service between prints. As none of the powder is trapped in the printer, the printer does not need to be cleaned out before it can print in a cartridge filled with a different material. This not only saves time, but also provides maximum flexibility to the customer since printers to not have to be dedicated to handling only one material.

Another advantage of the described additive manufacturing system is that the cartridge and or stations can be slightly or highly modified to suit the requirements of customers. For example, a cartridge could be designed with print plate of much smaller surface area or of a different shape (i.e. round instead of square). This could for example allow a customer to print small volumes of very expensive materials (e.g. gold). This small volume cartridge could be designed to interface with various print stations to maximize the print material flexibility for the customer.

Another advantage of the described additive manufacturing system is that it allows thermal processing of prints (e.g. heat treating, annealing, controlled cool down) without removing the prints from the controlled environment in which they were printed (i.e. the print cartridge heats and cools and controls the atmosphere). Cartridges can be sent to the storage rack and kept at any temperature in any gas environment as dictated by the customer. The prints have not been exposed to atmospheric air or allowed to cool, so the customer has excellent control to affect the material properties. This may also mitigate problems with print plates warping due to thermal stress.

Another advantage of the described additive manufacturing system is that it allows creating prints in any of multiple print cartridges that can be installed simultaneously in one or more auxiliary print stations. This will further reduce overall print time by utilizing laser energy that would otherwise be wasted. It will also provide the customer with flexibility in scheduling prints and will also increase machine utilization.

Another advantage of the described additive manufacturing system is that the cartridge and features in mating equipment could be implemented as standard or optional features on additive manufacturing systems made by other equipment makers. The technology provided as subsystems to be incorporated into additive manufacturing equipment using laser powder bed fusion or other 3D printing methods. Any additive manufacturing system which utilizes the cartridge/stations scheme will enjoy the benefits of this scheme. Cartridges and stations could be slightly or highly modified to suit the particular needs of manufacturers or customers.

Various alternatives or augmentations of various components of the described additive manufacturing system are contemplated. For example:

The bellows of embodiments illustrated with respect to FIGS. 1H, 1I, and 1J can be replaced or supplemented with a series of sliding plates (cables, etc.) which would support the window so that it is allowed to move freely in the X and Y axes but is prevented from sagging in the Z axis. Powder hoppers may be partially filled by the user if less powder is needed for a specific print.

Blade spreaders can be substituted with rollers or electrostatic spreader.

Powder spreader drive can be installed remotely and driven by a suitable interface that transfers power to the mechanism (e.g. a flex shaft). The powder spreader can be actuated by many types of actuators including gear drives. In some embodiments the powder spreader can be a removable and upgradable subsystem of the cartridge.

A HEPA filter may be installed on the print cartridge on mating equipment, or in both places. The HEPA filter can also have a pre-filter such as a vortex separator or screen to handle large volumes of soot.

Multiple gas supply and return ports can be supported, and the gas supply and return ports can be physically located in different places on the cartridge to prevent different powder types from mixing.

In some embodiments, a camera can take video and stills to provide a virtual window. Camera and lights can illuminate and image in multiple light wavelengths (e.g. IR, visible, or UV). The camera may be an array of several cameras that could record still and or video images from many different angles in one or many light wavelengths. The lights can be one or an array of many lights that illuminate the cartridge from many angles and in many different wavelengths. A virtual window can be viewed from anywhere, so images can be sent to a remote viewing location. The virtual window monitor could be located on the cartridge itself, on the print station front face, or as a display on a monitor mounted on an industrial monitor/keyboard arm. In some embodiments the cartridge may also have a physical window or port to allow direct viewing by eye or by and external camera or other sensor.

Various types of cartridge transport are contemplated. In some embodiments, rollers can be replaced with telescoping tubes, pick and place robot, overhead lifting, rails, or conveyors. Forklift tubes can be replaced with a cart, automated equipment like a conveyor belt, rails, robotic equipment like bottom lift stockers, robotic tug, or a robotic forklift. Use of an overhead gantry/crane mechanism; a (manual or fully automated) cart or buggy that rolls on the floor, arrive on a manual or automated railway system which could be wheeled or unwheeled (maglev, air bearing), robotic manipulator, conformal body power suit are alternative embodiments.

The plunger/z-axis piston can be mated with a zero-point clamp, or some other kind of automated clamp The safety shield may be part of the cartridge or be attached to the print engine or some combination of both. Its material will be opaque to laser light. Its outer surface will need to be cool to the touch while the system is operating.

To prevent cross contamination between the powder types, the interface plate may use different configurations or be located in different areas (e.g. be shifted to the left or right, or up and down) depending on the type of gas or powder sued in the cartridge. For example, the recycled gas ports for cartridges containing steel powder may be to the left and those containing aluminum powder may be to the right. The ports for different materials would not line up and so operators could not mistakenly plug the wrong cartridge into a gas recycler. In some embodiments, multiple gas recyclers in each print engine can support printing different materials. For example, drive gas recycler impellers using an external motor can be switched between two sets of impellers. This allows for use of only one expensive motor to drive two relatively less expensive impellers in separate gas ducts for separate materials. In some embodiments a gas recycling module (a gas cartridge) that can be inserted or removed from the print engine depending on what material requires processing. In some embodiments the gas recycling equipment including the filters could be installed directly on the print engine. In other embodiments, the filters and "material-dependent" equipment are installed in the cartridge unit itself and thus completely avoid any cross-contamination when installing different cartridges containing different materials.

The storage rack can be made in many different sizes to carry one or many multiples of cartridges. Cartridges can be programmed at the storage rack and automatically set up for the job to be run based on pre-determined job-scheduling. Electronic memory held within each cartridge could interface with the robotic manipulation system, crane, railway, transportation apparatus or communicate with the transporter and/or its operator, or system to tell it which print station/engine to connect to in a production setting. A cartridge can be battery powered so sensor or information providing functionality is possible when dismounted.

The print engine could have more than one auxiliary print station attached to it (i.e. 1-N), N could be 1, 10, 100, or 1000, or somewhere in between, or more.

Print cartridges could be filled with the same or different materials while simultaneously or sequentially printing.

Laser light could be split among the print stations before patterning where each print station has its own light valve or patterning device. In other embodiments, laser light could be split among the chamber after patterning where the first chamber gets the positive (priority) image, and subsequent chambers get the leftover (negative) images.

The energy fluence directed to each cartridge could be the same or could change based on the material type.

In one embodiment use of print cartridges and/or print engine can be prioritized, with use of each print cartridge or engine able to be prioritized before or during the print. For example, a cartridge with priority can remain static or can change based on inputs (i.e. from the user such as a job priority change, or due to print completion, print error, or other outside desire). The priority of any cartridge can be promoted or demoted. For example, if there are two cartridges, and a top priority cartridge becomes idle (due to user intervention, sub-system process such as spreading, image loading, or the like, error, etc.) priority will then change to the previously lower priority cartridge so overall printing throughput is maximized. Variations of this are true for any number of cartridge greater than one. As another example, a customer could prioritize the printing of a high temperature print in a primary print station with inserted primary cartridge, and assign a lower priority to a room temperature, less demanding print in the auxiliary print station(s). The low temperature print can proceed at a much slower pace without sacrificing print quality, or needlessly keeping the auxiliary chamber hot.

Each print cartridge in each print station could be printing the same or different print files. Each print could be started and stopped while prints in auxiliary print cartridges continue to print. Print cartridges can be installed or removed from the print station during printing operations with more than one chamber without interrupting the print process in the non-removed chambers.

Figure 2:
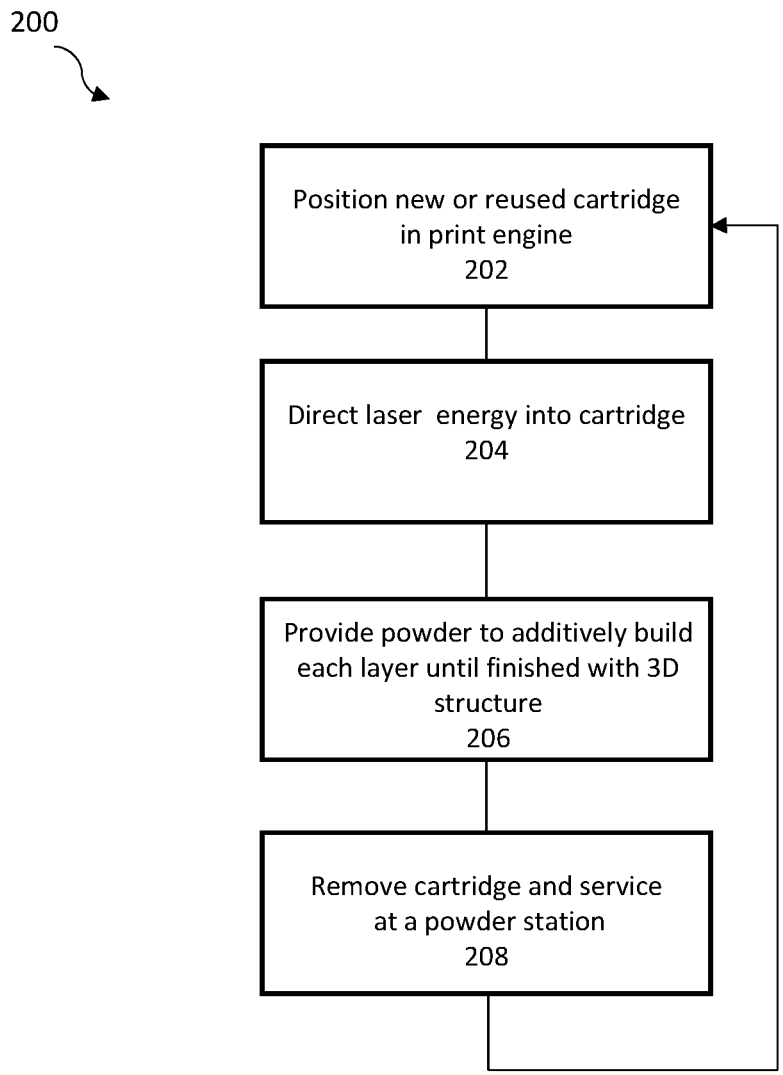
FIG. 2 illustrates a method for operation of a cartridge based additive manufacturing system.

FIG. 2 illustrates a process flow 200 for operation of a cartridge based additive manufacturing system. In step 202, a new or reused cartridge is positioned in a print engine. In step 204, laser energy is directed into the cartridge to build a 3D part. In step 204, laser energy is directed into the cartridge to fuse, sinter, melt or otherwise modify a powder layer. In step 206, additional powder is positioned and subjected to laser energy, with the process additively repeating to build each layer and produce a 3D print structure. In step 208 the cartridge can be removed and serviced at a separate powder handling station. The serviced cartridge or a fresh cartridge can be positioned in the print engine for manufacture of additional or new 3D prints.

Figure 3:
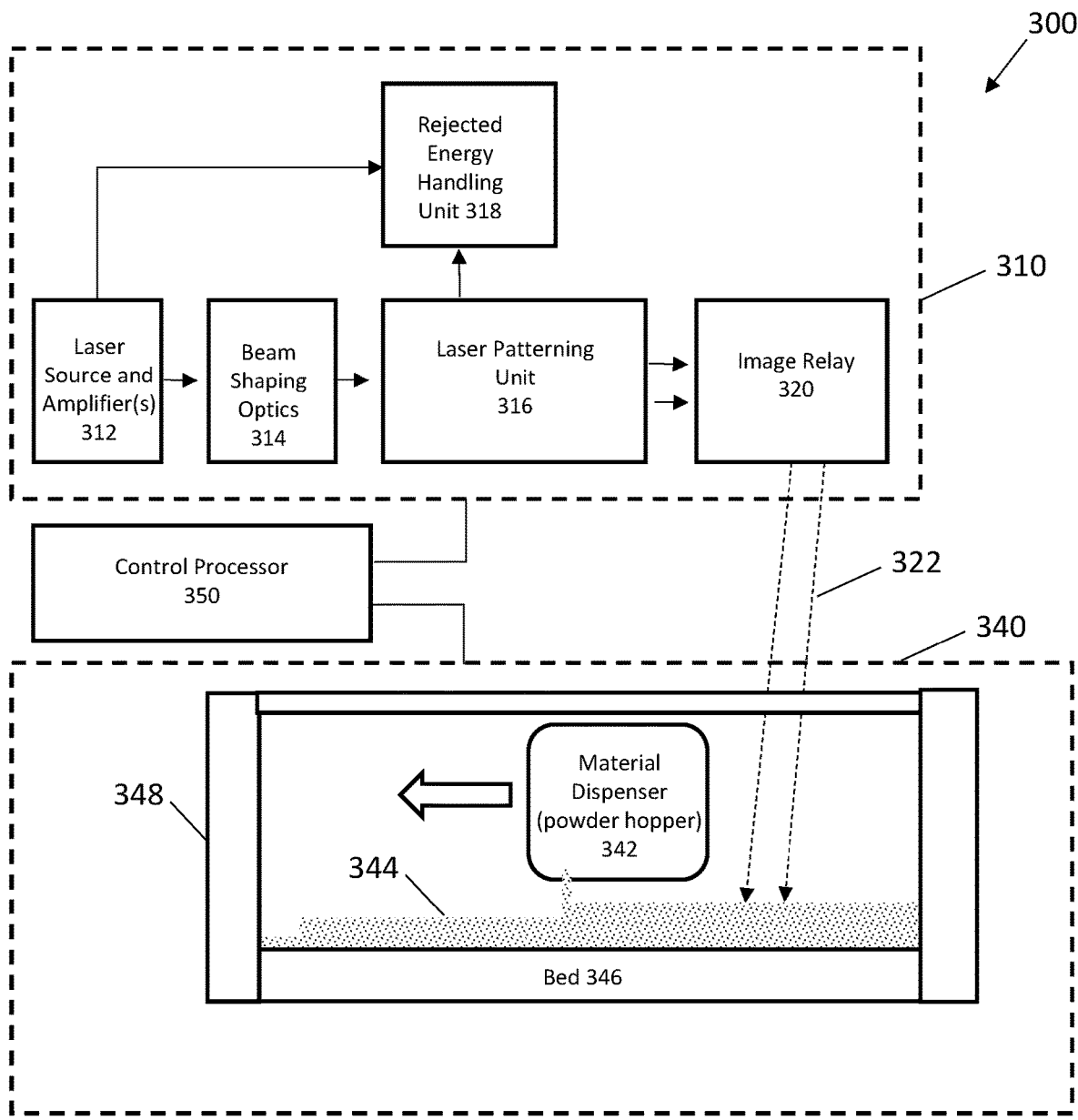
FIG. 3 illustrates a cartridge based additive manufacturing system able to provide one or two dimensional light beams to a cartridge.

In another embodiment illustrated with respect to FIG. 3, additive manufacturing systems such as illustrated with respect to FIGS. 1A-H and the process flow of FIG. 2 can be represented by various modules that form additive manufacturing method and system 300. As seen in FIG. 3, a laser source and amplifier(s) 312 can be constructed as a continuous or pulsed laser. In other embodiments the laser source includes a pulse electrical signal source such as an arbitrary waveform generator or equivalent acting on a continuous-laser-source such as a laser diode. In some embodiments this could also be accomplished via a fiber laser or fiber launched laser source which is then modulated by an acousto-optic or electro optic modulator. In some embodiments a high repetition rate pulsed source which uses a Pockels cell can be used to create an arbitrary length pulse train.

Possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/$MnCl_2$) vapor laser. Rubidium or other alkali metal vapor lasers can also be used. A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate(Nd:$YVO_4$) laser, Neodymium doped yttrium calcium oxoborateNd:$YCa_4O(BO_3)_3$ or simply Nd:YCOB, Neodymium glass(Nd:Glass) laser, Titanium sapphire(Ti:sapphire) laser, Thulium YAG (Tm:YAG) laser, Ytterbium YAG (Yb:YAG) laser, Ytterbium:$2O_3$ (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride(Ce:LiSAF, Ce:LiCAF), Promethium 147 doped phosphate glass (147Pm+3:Glass) solid-state laser, Chromium doped chrysoberyl (alexandrite) laser, Erbium doped and erbium-ytterbium co-doped glass lasers, Trivalent uranium doped calcium fluoride (U:$CaF_2$) solid-state laser, Divalent samarium doped calcium fluoride(Sm:$CaF_2$) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

As illustrated in FIG. 3, the additive manufacturing system 300 uses lasers able to provide one or two dimensional directed energy as part of an energy patterning system 310. In some embodiments, one dimensional patterning can be directed as linear or curved strips, as rastered lines, as spiral lines, or in any other suitable form. Two dimensional patterning can include separated or overlapping tiles, or images with variations in laser intensity. Two dimensional image patterns having non-square boundaries can be used, overlapping or interpenetrating images can be used, and images can be provided by two or more energy patterning systems. The energy patterning system 310 uses laser source and amplifier(s) 312 to direct one or more continuous or intermittent energy beam(s) toward beam shaping optics 314. After shaping, if necessary, the beam is patterned by an energy patterning unit 316, with generally some energy being directed to a rejected energy handling unit 318. Patterned energy is relayed by image relay 320 toward an article processing unit 340, in one embodiment as a two-dimensional image 322 focused near a bed 346. The article processing unit 340 can include a cartridge such as previously discussed. The article processing unit 340 has plate or bed 346 (with walls 348) that together form a sealed cartridge chamber containing material 344 (e.g. a metal powder) dispensed by powder hopper or other material dispenser 342. Patterned energy, directed by the image relay 320, can melt, fuse, sinter, amalgamate, change crystal structure, influence stress patterns, or otherwise chemically or physically modify the dispensed and distributed material 344 to form structures with desired properties. A control processor 350 can be connected to variety of sensors, actuators, heating or cooling systems, monitors, and controllers to coordinate operation of the laser source and amplifier(s) 312, beam shaping optics 314, laser patterning unit 316, and image relay 320, as well as any other component of system 300. As will be appreciated, connections can be wired or wireless, continuous or intermittent, and include capability for feedback (for example, thermal heating can be adjusted in response to sensed temperature).

In some embodiments, beam shaping optics 314 can include a great variety of imaging optics to combine, focus, diverge, reflect, refract, homogenize, adjust intensity, adjust frequency, or otherwise shape and direct one or more laser beams received from the laser source and amplifier(s) 312 toward the laser patterning unit 316. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

Laser patterning unit 316 can include static or dynamic energy patterning elements. For example, laser beams can be blocked by masks with fixed or movable elements. To increase flexibility and ease of image patterning, pixel addressable masking, image generation, or transmission can be used. In some embodiments, the laser patterning unit includes addressable light valves, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In certain embodiments, non-optically addressed light valves can be used. These can include but are not limited to electrically addressable pixel elements, movable mirror or micro-mirror systems, piezo or micro-actuated optical systems, fixed or movable masks, or shields, or any other conventional system able to provide high intensity light patterning.

Rejected energy handling unit 318 is used to disperse, redirect, or utilize energy not patterned and passed through the image relay 320. In one embodiment, the rejected energy handling unit 318 can include passive or active cooling elements that remove heat from both the laser source and amplifier(s) 312 and the laser patterning unit 316. In other embodiments, the rejected energy handling unit can include a "beam dump" to absorb and convert to heat any beam energy not used in defining the laser pattern. In still other embodiments, rejected laser beam energy can be recycled using beam shaping optics 314. Alternatively, or in addition, rejected beam energy can be directed to the article processing unit 340 for heating or further patterning. In certain embodiments, rejected beam energy can be directed to additional energy patterning systems or article processing units.

In one embodiment, a "switchyard" style optical system can be used. Switchyard systems are suitable for reducing the light wasted in the additive manufacturing system as caused by rejection of unwanted light due to the pattern to be printed. A switchyard involves redirections of a complex pattern from its generation (in this case, a plane whereupon a spatial pattern is imparted to structured or unstructured beam) to its delivery through a series of switch points. Each switch point can optionally modify the spatial profile of the incident beam. The switchyard optical system may be utilized in, for example and not limited to, laser-based additive manufacturing techniques where a mask is applied to the light. Advantageously, in various embodiments in accordance with the present disclosure, the thrown-away energy may be recycled in either a homogenized form or as a patterned light that is used to maintain high power efficiency or high throughput rates. Moreover, the thrown-away energy can be recycled and reused to increase intensity to print more difficult materials.

Image relay 320 can receive a patterned image (either one or two-dimensional) from the laser patterning unit 316 directly or through a switchyard and guide it toward the article processing unit 340. In a manner similar to beam shaping optics 314, the image relay 320 can include optics to combine, focus, diverge, reflect, refract, adjust intensity, adjust frequency, or otherwise shape and direct the patterned light. Patterned light can be directed using movable mirrors, prisms, diffractive optical elements, or solid state optical systems that do not require substantial physical movement. One of a plurality of lens assemblies can be configured to provide the incident light having the magnification ratio, with the lens assemblies both a first set of optical lenses and a second sets of optical lenses, and with the second sets of optical lenses being swappable from the lens assemblies. Rotations of one or more sets of mirrors mounted on compensating gantries and a final mirror mounted on a build platform gantry can be used to direct the incident light from a precursor mirror onto a desired location. Translational movements of compensating gantries and the build platform gantry are also able to ensure that distance of the incident light from the precursor mirror the article processing unit 340 is substantially equivalent to the image distance. In effect, this enables a quick change in the optical beam delivery size and intensity across locations of a build area for different materials while ensuring high availability of the system.

The material dispenser 342 (e.g. powder hopper) in article processing unit 340 (e.g. cartridge) can distribute, remove, mix, provide gradations or changes in material type or particle size, or adjust layer thickness of material. The material can include metal, ceramic, glass, polymeric powders, other melt-able material capable of undergoing a thermally induced phase change from solid to liquid and back again, or combinations thereof. The material can further include composites of melt-able material and non-melt-able material where either or both components can be selectively targeted by the imaging relay system to melt the component that is melt-able, while either leaving along the non-melt-able material or causing it to undergo a vaporizing/destroying/combusting or otherwise destructive process. In certain embodiments, slurries, sprays, coatings, wires, strips, or sheets of materials can be used. Unwanted material can be removed for disposable or recycling by use of blowers, vacuum systems, sweeping, vibrating, shaking, tipping, or inversion of the bed 346.

In addition to material handling components, the article processing unit 340 can include components for holding and supporting 3D structures, mechanisms for heating or cooling the chamber, auxiliary or supporting optics, and sensors and control mechanisms for monitoring or adjusting material or environmental conditions. The article processing unit can, in whole or in part, support a vacuum or inert gas atmosphere to reduce unwanted chemical interactions as well as to mitigate the risks of fire or explosion (especially with reactive metals). In some embodiments, various pure or mixtures of other atmospheres can be used, including those containing Ar, He, Ne, Kr, Xe, CO2, N2, 02, SF6, CH4, CO, N20, C2H2, C2H4, C2H6, C3H6, C3H8, i-C4H10, C4H10, 1-C4H8, cic-2,C4H7, 1,3-C4H6, 1,2-C4H6, C5H12, n-05H12, i-05H12, n-C6H14, C2H3C1, C7H16, C8H18, C10H22, C11H24, C12H26, C13H28, C14H30, C15H32, C16H34, C6H6, C6H5-CH3, C8H10, C2H5OH, CH3OH, iC4H8. In some embodiments, refrigerants or large inert molecules (including but not limited to sulfur hexafluoride) can be used. An enclosure atmospheric composition to have at least about 1% He by volume (or number density), along with selected percentages of inert/non-reactive gasses can be used.

In certain embodiments, a plurality of article processing units, cartridges, or build chambers, each having a build platform to hold a powder bed, can be used in conjunction with multiple optical-mechanical assemblies arranged to receive and direct the one or more incident energy beams into the cartridges. Multiple cartridges allow for concurrent printing of one or more print jobs.

In another embodiment, one or more article processing units, cartridges, or build chambers can have a cartridge that is maintained at a fixed height, while optics are vertically movable. A distance between final optics of a lens assembly and a top surface of powder bed a may be managed to be essentially constant by indexing final optics upwards, by a distance equivalent to a thickness of a powder layer, while keeping the build platform at a fixed height. Advantageously, as compared to a vertically moving the build platform, large and heavy objects can be more easily manufactured, since precise micron scale movements of the ever changing mass of the build platform are not needed. Typically, build chambers intended for metal powders with a volume more than ~0.1-0.2 cubic meters (i.e., greater than 100-200 liters or heavier than 500-1,000 kg) will most benefit from keeping the build platform at a fixed height.

In one embodiment, a portion of the layer of the powder bed in a cartridge may be selectively melted or fused to form one or more temporary walls out of the fused portion of the layer of the powder bed to contain another portion of the layer of the powder bed on the build platform. In selected embodiments, a fluid passageway can be formed in the one or more first walls to enable improved thermal management.

In some embodiments, the additive manufacturing system can include article processing units or cartridges that supports a powder bed capable of tilting, inverting, and shaking to separate the powder bed substantially from the build platform in a hopper. The powdered material forming the powder bed may be collected in a hopper for reuse in later print jobs. The powder collecting process may be automated, and vacuuming or gas jet systems also used to aid powder dislodgement and removal.

Some embodiments, the additive manufacturing system can be configured to easily handle parts longer than an available build chamber or cartridge. A continuous (long) part can be sequentially advanced in a longitudinal direction from a first zone to a second zone. In the first zone, selected granules of a granular material can be amalgamated. In the second zone, unamalgamated granules of the granular material can be removed. The first portion of the continuous part can be advanced from the second zone to a third zone, while a last portion of the continuous part is formed within the first zone and the first portion is maintained in the same position in the lateral and transverse directions that the first portion occupied within the first zone and the second zone. In effect, additive manufacture and clean-up (e.g., separation and/or reclamation of unused or unamalgamated granular material) may be performed in parallel (i.e., at the same time) at different locations or zones on a part conveyor, with no need to stop for removal of granular material and/or parts.

In another embodiment, additive manufacturing capability can be improved by use of an enclosure restricting an exchange of gaseous matter between an interior of the enclosure and an exterior of the enclosure. An airlock provides an interface between the interior and the exterior; with the interior having multiple additive manufacturing chambers, including those supporting power bed fusion. A gas management system maintains gaseous oxygen within the interior at or below a limiting oxygen concentration, increasing flexibility in types of powder and processing that can be used in the system.

In another manufacturing embodiment, capability can be improved by having a article processing units, cartridges, or build chamber contained within an enclosure, the build chamber being able to create a part having a weight greater than or equal to 2,000 kilograms. A gas management system may maintain gaseous oxygen within the enclosure at concentrations below the atmospheric level. In some embodiments, a wheeled vehicle may transport the part from inside the enclosure, through an airlock, since the airlock operates to buffer between a gaseous environment within the enclosure and a gaseous environment outside the enclosure, and to a location exterior to both the enclosure and the airlock.

Other manufacturing embodiments involve collecting powder samples in real-time from the powder bed. An ingester system is used for in-process collection and characterizations of powder samples. The collection may be performed periodically and the results of characterizations result in adjustments to the powder bed fusion process. The ingester system can optionally be used for one or more of audit, process adjustments or actions such as modifying printer parameters or verifying proper use of licensed powder materials.

Yet another improvement to an additive manufacturing process can be provided by use of a manipulator device such as a crane, lifting gantry, robot arm, or similar that allows for the manipulation of parts that would be difficult or impossible for a human to move is described. The manipulator device can grasp various permanent or temporary additively manufactured manipulation points on a part to enable repositioning or maneuvering of the part.

Control processor 350 can be connected to control any components of additive manufacturing system 300 described herein, including lasers, laser amplifiers, optics, heat control, build chambers, and manipulator devices. The control processor 350 can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor can be a single central controller, or alternatively, can include one or more independent control systems. The controller processor 350 is provided with an interface to allow input of manufacturing instructions. Use of a wide range of sensors allows various feedback control mechanisms that improve quality, manufacturing throughput, and energy efficiency.

Figure 4:
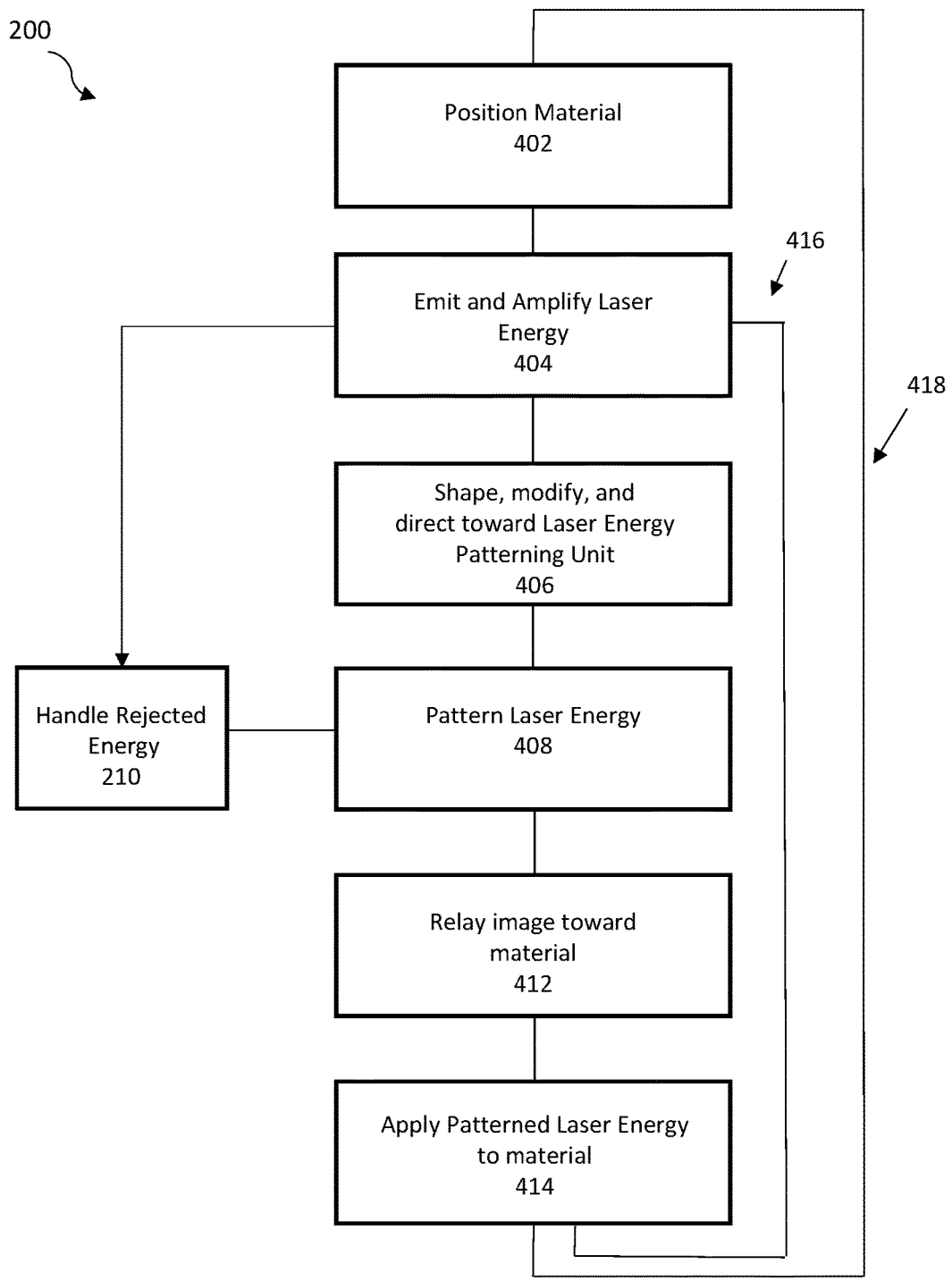
FIG. 4 illustrates a method of operating a cartridge based additive manufacturing system able to provide one or two dimensional light beams to a cartridge.

One embodiment of operation of a manufacturing system suitable for additive or subtractive manufacture is illustrated in FIG. 4. In this embodiment, a flow chart 400 illustrates one embodiment of a manufacturing process supported by the described optical and mechanical components. In step 402, material is positioned in a cartridge, bed, chamber, or other suitable support. The material can be a metal plate for laser cutting using subtractive manufacture techniques, or a powder capable of being melted, fused, sintered, induced to change crystal structure, have stress patterns influenced, or otherwise chemically or physically modified by additive manufacturing techniques to form structures with desired properties.

In step 404, unpatterned laser energy is emitted by one or more energy emitters, including but not limited to solid state or semiconductor lasers, and then amplified by one or more laser amplifiers. In step 406, the unpatterned laser energy is shaped and modified (e.g. intensity modulated or focused). In step 408, this unpatterned laser energy is patterned, with energy not forming a part of the pattern being handled in step 410 (this can include conversion to waste heat, recycling as patterned or unpatterned energy, or waste heat generated by cooling the laser amplifiers in step 404). In step 412, the patterned energy, now forming a one or two-dimensional image is relayed toward the material. In step 414, the image is applied to the material, either subtractively processing or additively building a portion of a 3D structure. For additive manufacturing, these steps can be repeated (loop 418) until the image (or different and subsequent image) has been applied to all necessary regions of a top layer of the material. When application of energy to the top layer of the material is finished, a new layer can be applied (loop 416) to continue building the 3D structure. These process loops are continued until the 3D structure is complete, when remaining excess material can be removed or recycled.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A cartridge for an additive manufacturing system, comprising:
   a sealable chamber having a powder bed in a x-y plane;
   a powder hopper positioned within the sealable chamber;
   a powder spreader positioned within the sealable chamber for distributing powder from the powder hopper onto the powder bed; and
   z-axis components comprising:
      a print plate supporting the powder bed;
      a plunger driven along the z-axis by a z-axis piston of a print station to lower the print plate after printing each layer at the powder bed; and
      a clamp for connecting the plunger of the cartridge with the z-axis piston of the print station.

2. The cartridge for the additive manufacturing system of claim 1, further comprising a laser transparent window that is positioned to allow an external camera to focus on the bed within the sealable chamber.

3. The cartridge for the additive manufacturing system of claim 1, wherein the sealable chamber supports a camera to focus on the bed within the sealable chamber.

4. The cartridge for the additive manufacturing system of claim 2, further comprising a wipe blade mounted within the sealable chamber to clean the laser transparent window.

5. The cartridge for the additive manufacturing system of claim 2, further comprising a bellows attached to the sealable chamber to hold the laser transparent window.

6. The cartridge for the additive manufacturing system of claim 1, wherein an electronic memory attached to the cartridge is configured to hold electronic information to identify the cartridge and control operation of a print station and is accessible by the interface plate.

7. The cartridge for the additive manufacturing system of claim 1, wherein the z-axis components further comprise a seal to confine the powder to the cartridge and a platform holding the powder bed.

8. The cartridge for the additive manufacturing system of claim 1, further comprising an interface plate for receiving power from the print station to power the powder hopper and the powder spreader.

9. The cartridge for the additive manufacturing system of claim 1, wherein the plunger seals the sealable chamber to prevent leakage of the powder.

10. A cartridge for an additive manufacturing system, comprising
   a sealable chamber having a powder bed in a x-y plane and a laser transparent window;
   a powder hopper positioned within the sealable chamber;
   a powder spreader for distributing powder from the powder hopper onto the powder bed;
   a bellows attached to the sealable chamber to hold the laser transparent window; and
   z-axis components comprising:
      a print plate supporting the powder bed;
      a plunger driven along the z-axis by a z-axis piston of a print station to lower the print plate after printing each layer at the powder bed; and
      a clamp for connecting the plunger with the z-axis piston of the print station.

11. The cartridge for the additive manufacturing system of claim 10, wherein the laser transparent window is positioned to allow an external camera to focus on the bed within the sealable chamber.

12. The cartridge for the additive manufacturing system of claim 10, wherein the sealable chamber supports a camera to focus on the bed within the sealable chamber.

13. The cartridge for the additive manufacturing system of claim 10, further comprising a wipe blade mounted within the sealable chamber to clean the laser transparent window.

14. A cartridge for an additive manufacturing system, comprising
   a sealable chamber having a powder bed in a x-y plane and a laser transparent window;
   a powder hopper positioned within the sealable chamber;
   a powder spreader positioned within the sealable chamber for distributing powder from the powder hopper onto the powder bed; and
   a wiper mechanism configured to clean an inside of the laser transparent window; and z-axis components comprising:
- a print plate supporting the powder bed;
- a plunger driven along the z-axis by a z-axis piston of a print station to lower the print plate after printing each layer at the powder bed; and
- a clamp for connecting the plunger of the cartridge with the z-axis piston of the print station.

15. The cartridge for the additive manufacturing system of claim 14, wherein the laser transparent window is positioned to allow an external camera to focus on the bed within the sealable chamber.

16. The cartridge for the additive manufacturing system of claim 14, wherein the sealable chamber supports a camera to focus on the bed within the sealable chamber.

* * * * *